(12) United States Patent
Henry

(10) Patent No.: US 10,396,539 B2
(45) Date of Patent: Aug. 27, 2019

(54) MODULAR CABLE PROTECTOR

(71) Applicant: Stephen K. Henry, Billings, MT (US)

(72) Inventor: Stephen K. Henry, Billings, MT (US)

(*) Notice: Subject to any disclaimer, the term of this patent is extended or adjusted under 35 U.S.C. 154(b) by 0 days.

(21) Appl. No.: 16/037,831

(22) Filed: Jul. 17, 2018

(65) Prior Publication Data

US 2019/0052071 A1    Feb. 14, 2019

Related U.S. Application Data

(60) Provisional application No. 62/542,523, filed on Aug. 8, 2017, provisional application No. 62/568,005, filed
(Continued)

(51) Int. Cl.
*H02G 3/04* (2006.01)
*H02G 9/04* (2006.01)
(Continued)

(52) U.S. Cl.
CPC .............. *H02G 9/04* (2013.01); *B66F 15/00* (2013.01); *H02G 3/34* (2013.01); *H02G 9/025* (2013.01);
(Continued)

(58) Field of Classification Search
CPC ...................... H02G 9/04; H02G 3/34; H02G 9/025; H02G 3/0418; H02G 3/0437; H02G 3/04; H02G 3/00; H02G 3/0406; H02G 3/263; H02G 9/00; H02G 9/02; H02G 3/22; H02G 3/30; H02G 3/36; B66F 15/00; E01C 5/226; E01C 13/04; E01C 9/086
USPC ...... 174/68.1, 101, 97, 70 C, 70 R, 68.3, 95, 174/72 R, 75 R; 248/74.1, 74.2, 68.1, 49; 14/69.5; 52/220.1, 220.8, 220.7
See application file for complete search history.

(56) References Cited

U.S. PATENT DOCUMENTS 3,888,186 A    6/1975    Jentzsch et al.
5,095,822 A    3/1992    Martin
(Continued)

FOREIGN PATENT DOCUMENTS

CN    203807909         9/2014
FR      2943077 A1      9/2010
WO   WO 2016/153734 A1  9/2016

OTHER PUBLICATIONS

Search Report and Written Opinion in PCT/2018/045071, 12 pages, dated Oct. 2, 2018.

*Primary Examiner* — Angel R Estrada
(74) *Attorney, Agent, or Firm* — Dorr, Carson & Birney, P.C.

(57) ABSTRACT

A plurality of modular cable protectors can be removably connected in series by complementary end connectors at each end. Each cable protector also includes a number of tool engagement features that that can be removably engaged by a tool that enables a user to exert an upward force to disengage the end connectors on adjacent cable protectors. For example, the tool engagement features can be slots in the top surface of the cable protector with undercuts adjacent to the lower ends of the slots. A tool with vertical rods is manually inserted into the slots to disengage the cable protectors. Horizontal projections at the bottom of the vertical rods engage the undercuts in the slots, and allow the user to disengage adjacent cable protectors by lifting upward on the tool.

13 Claims, 24 Drawing Sheets

Related U.S. Application Data on Oct. 4, 2017, provisional application No. 62/594,144, filed on Dec. 4, 2017.

(51) Int. Cl.
   *B66F 15/00* (2006.01)
   *H02G 3/34* (2006.01)
   *H02G 9/02* (2006.01)

(52) U.S. Cl.
   CPC ......... *H02G 3/0418* (2013.01); *H02G 3/0437* (2013.01)

(56) References Cited

U.S. PATENT DOCUMENTS

| | | | |
|---|---|---|---|
| 5,123,776 A | 6/1992 | Lang et al. | |
| D412,490 S | 8/1999 | Henry | |
| 6,499,410 B1 * | 12/2002 | Berardi | H02G 9/02 104/275 |
| 6,747,212 B1 * | 6/2004 | Henry | H02G 3/283 174/101 |
| 7,145,079 B1 * | 12/2006 | Henry | H02G 3/0418 174/101 |
| 7,309,836 B2 * | 12/2007 | Lubanski | H02G 3/0418 174/720 |
| 8,001,643 B1 | 8/2011 | James | |
| 8,309,850 B2 * | 11/2012 | Henry | H01R 25/164 174/68.1 |
| 8,434,739 B1 | 5/2013 | Connolly | |
| 8,791,363 B2 | 7/2014 | Lubanski | |
| D717,248 S * | 11/2014 | Coffman | D13/155 |
| 9,103,075 B2 | 8/2015 | Kaylor et al. | |
| 9,438,022 B2 | 9/2016 | Lioi | |
| 2014/0311048 A1 | 10/2014 | Hill et al. | |
| 2016/0023873 A1 | 1/2016 | Kasan | |

\* cited by examiner

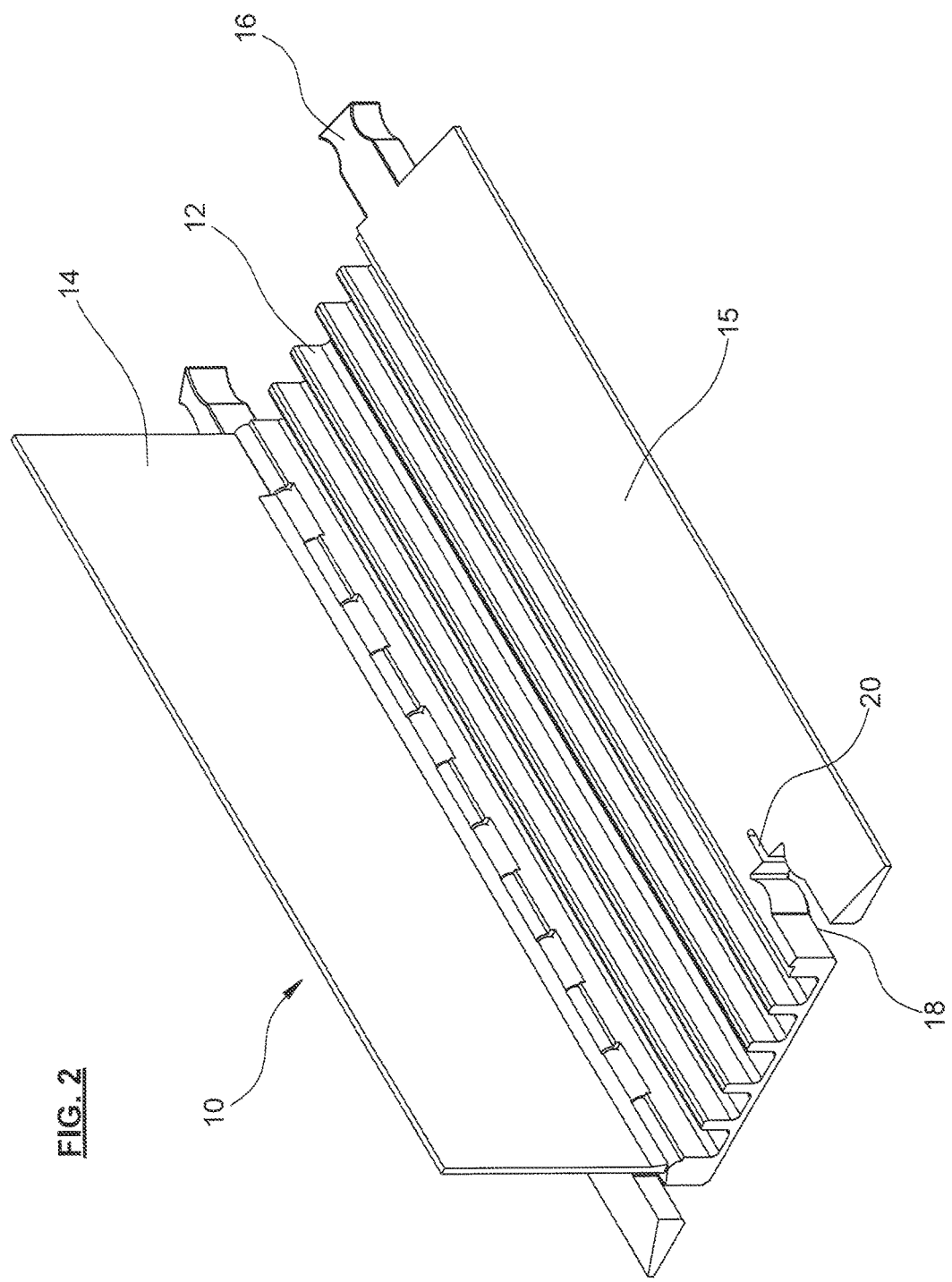

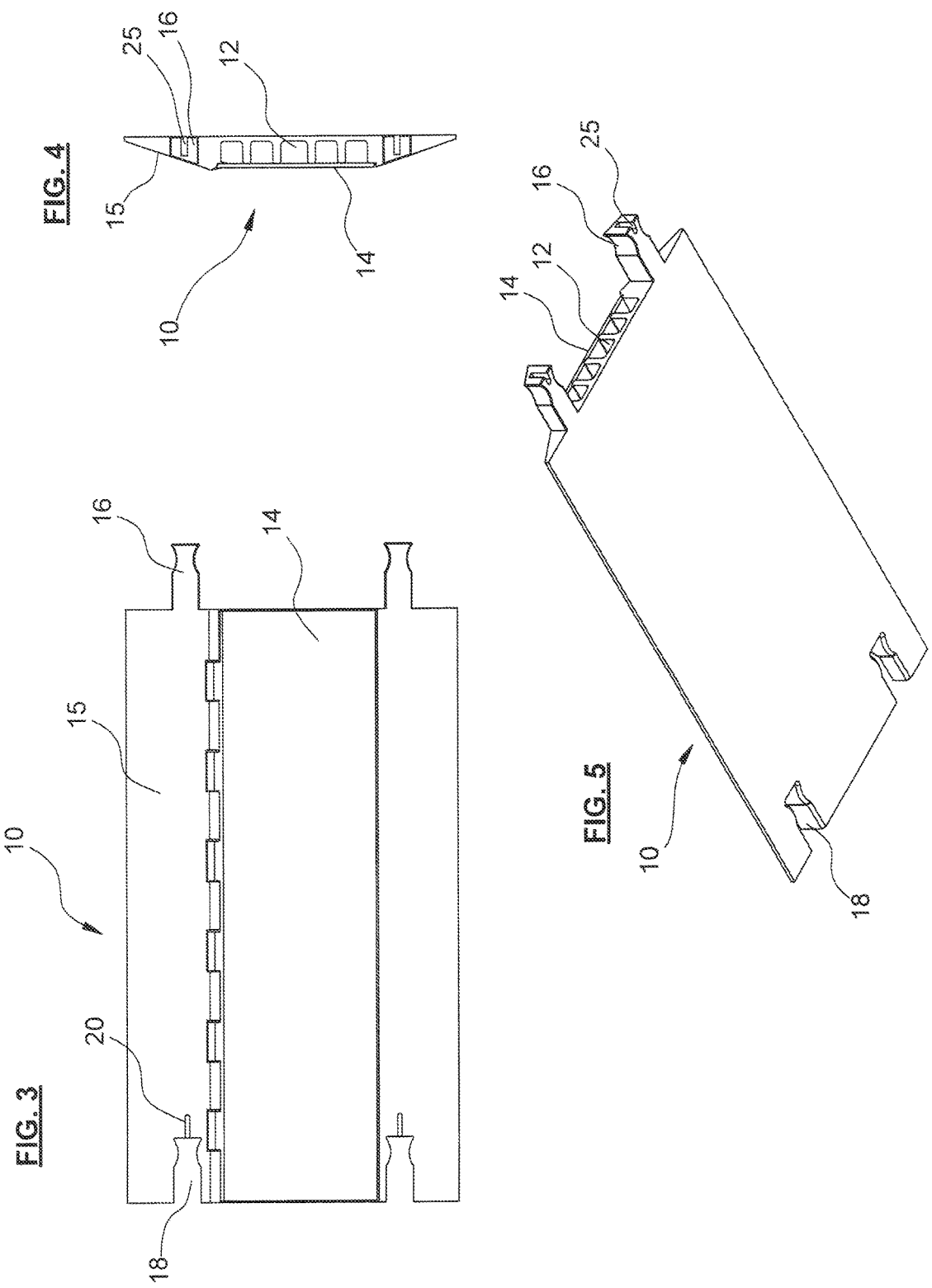

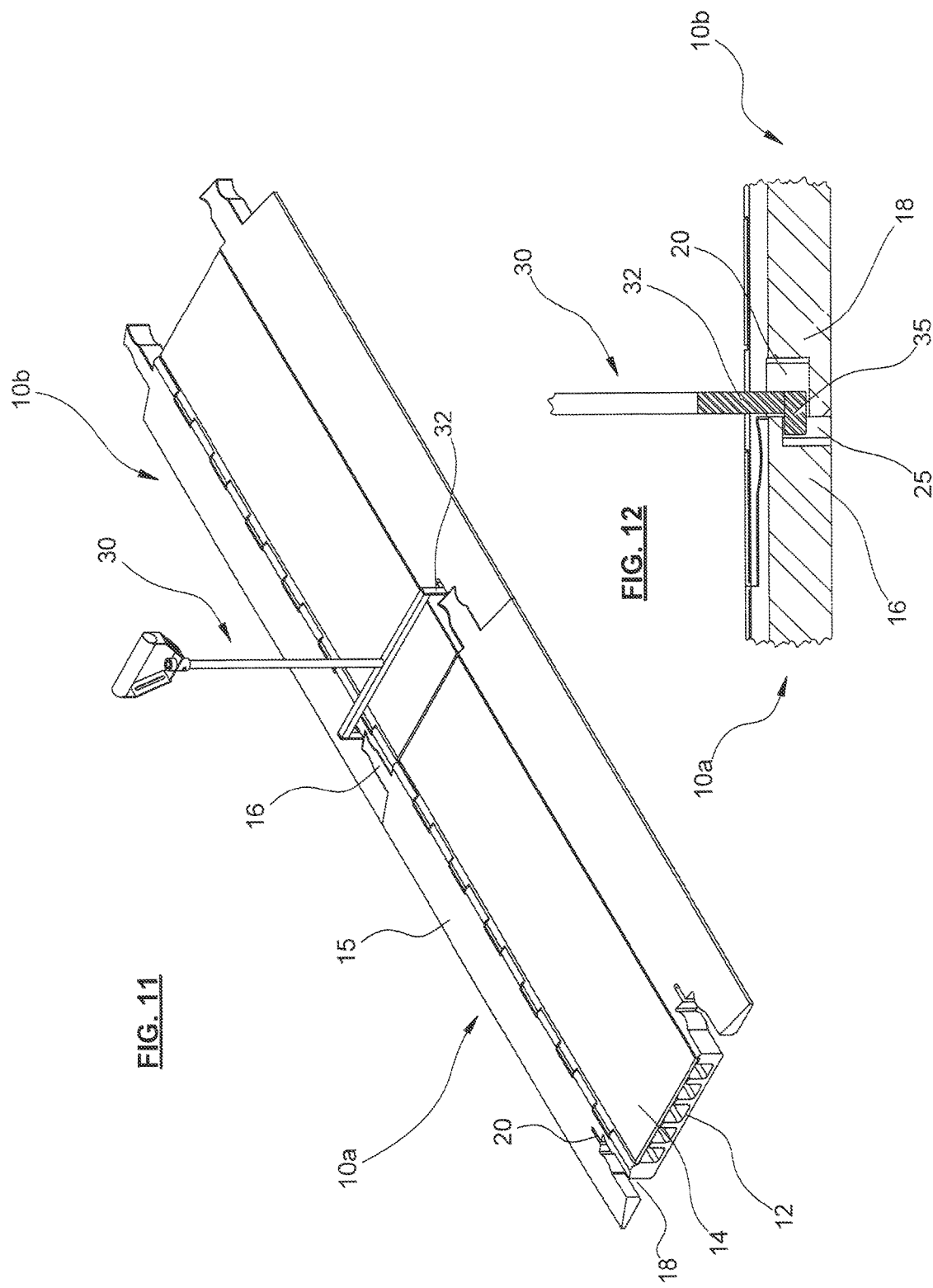

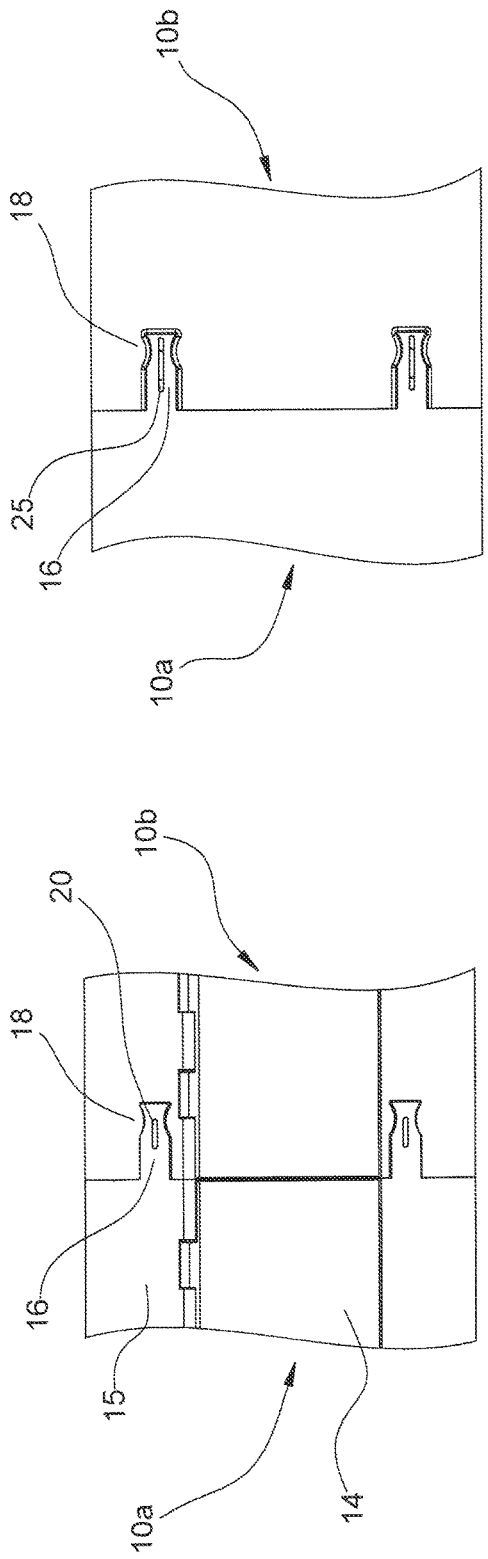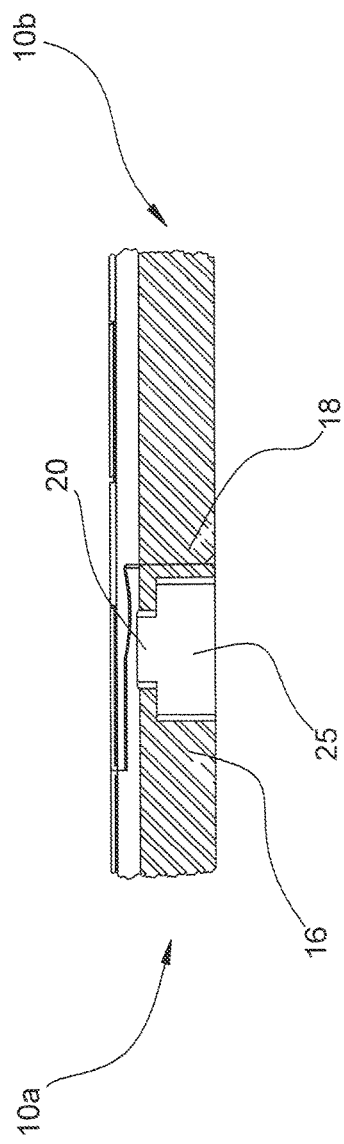

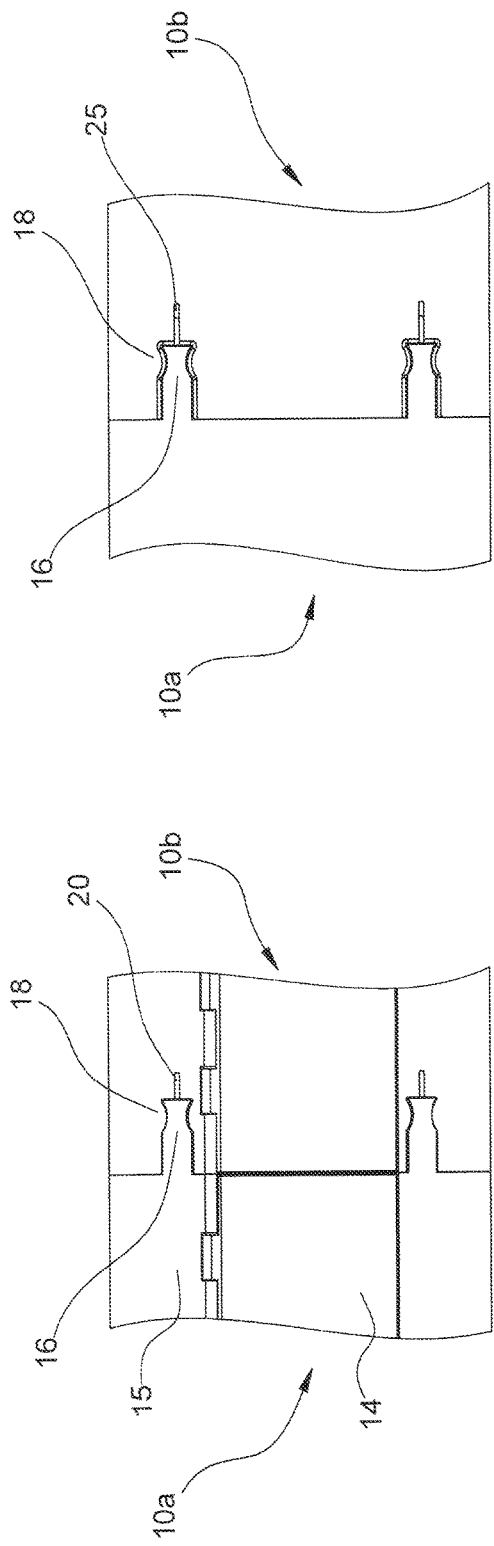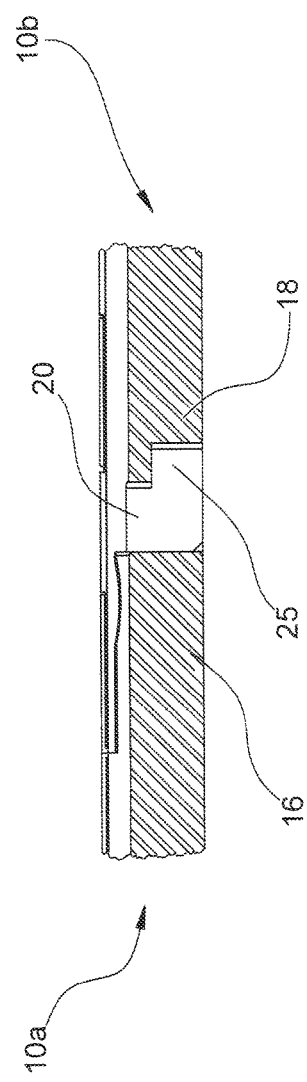

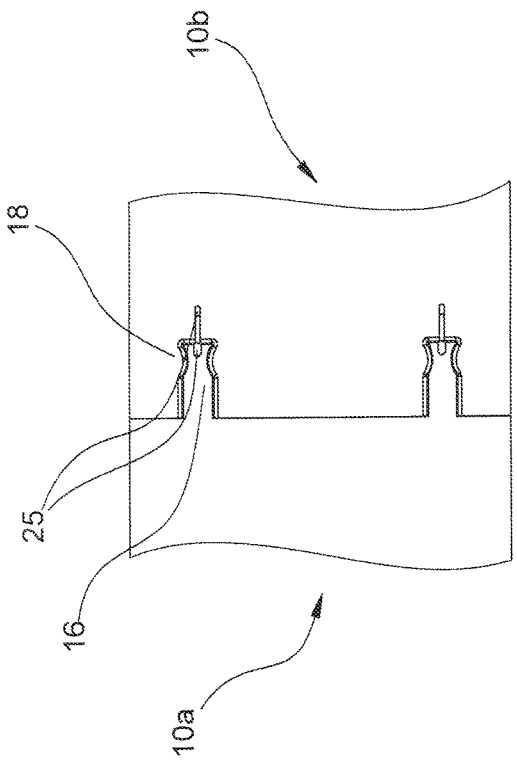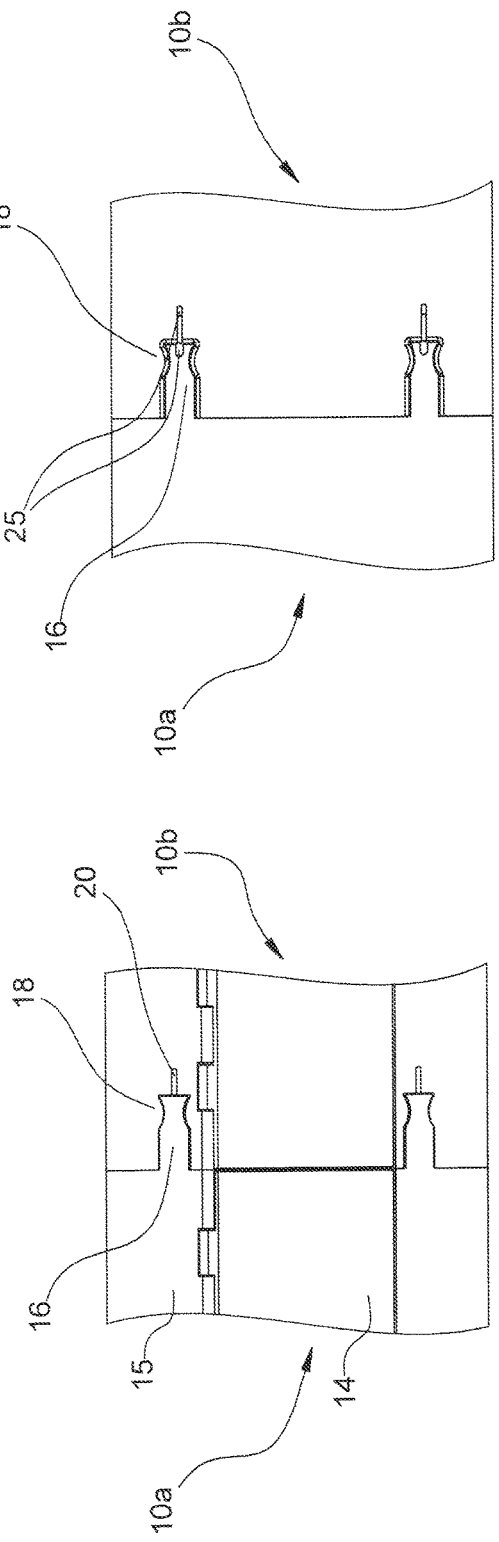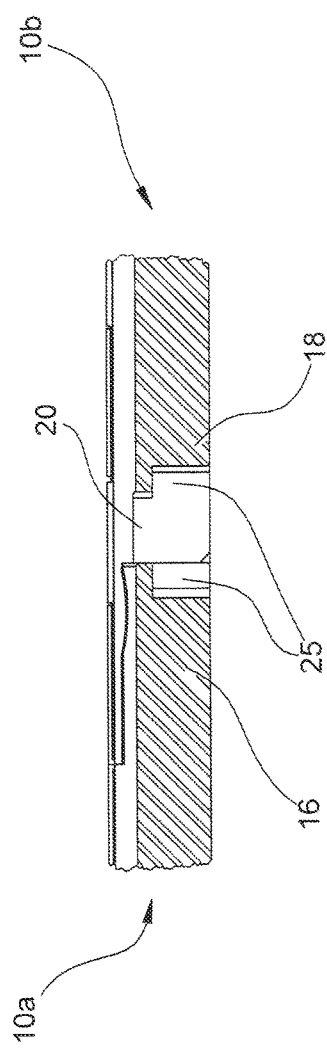

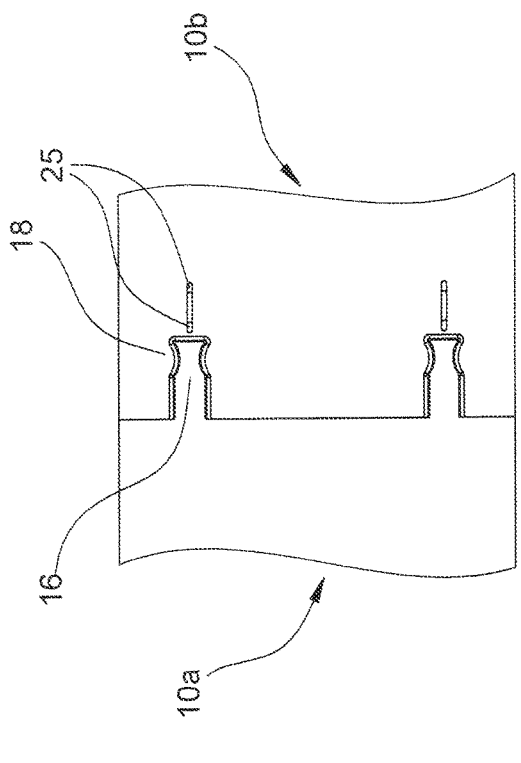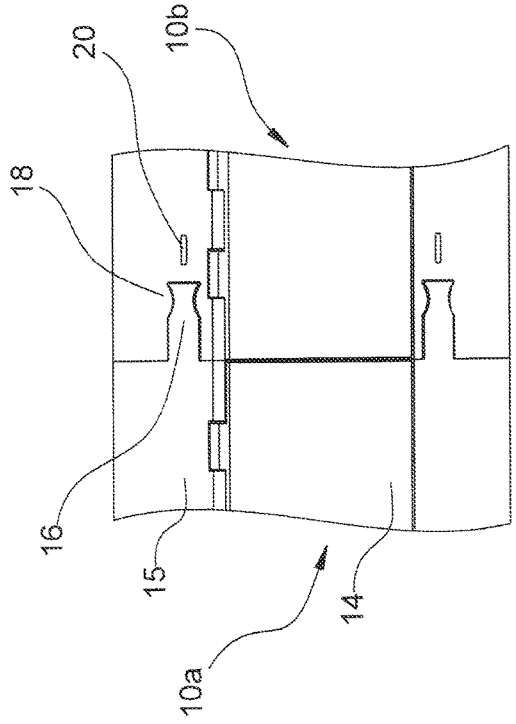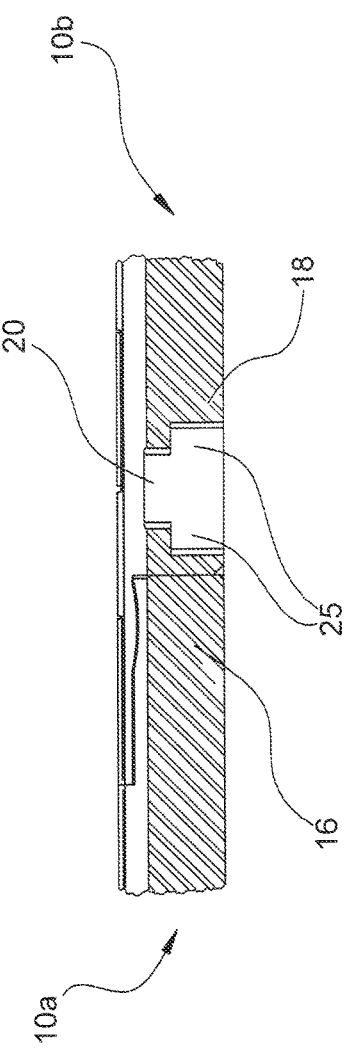

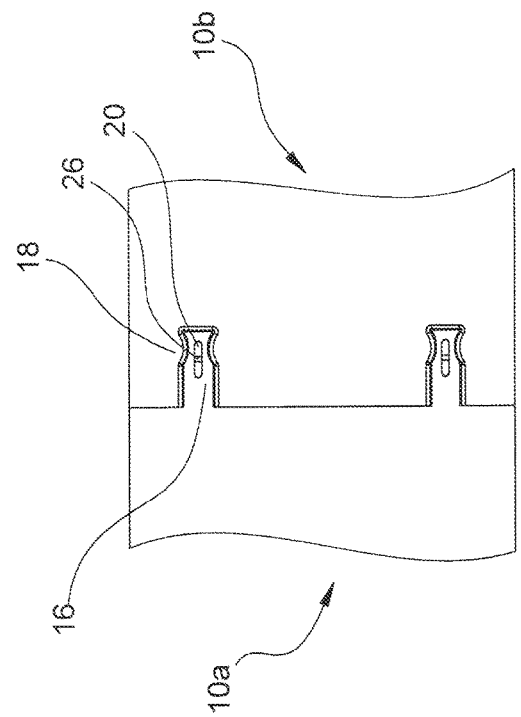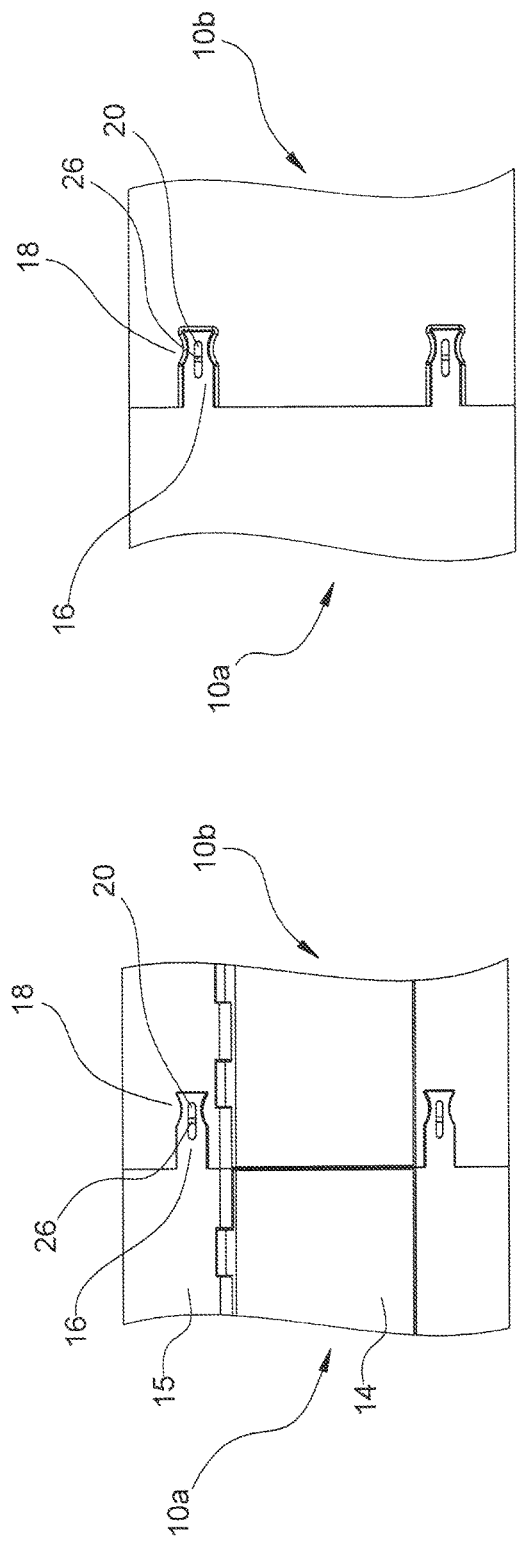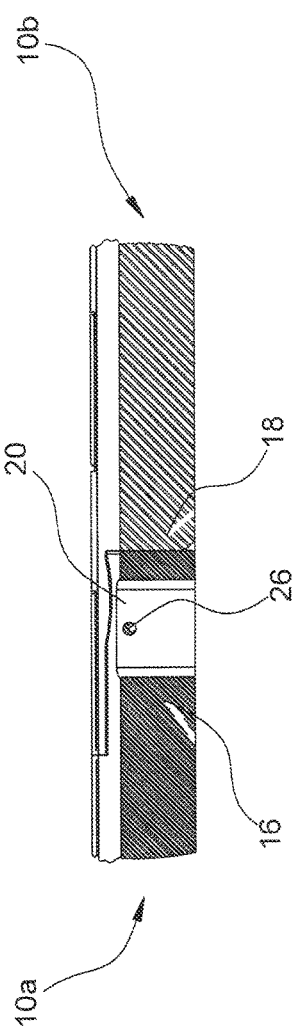

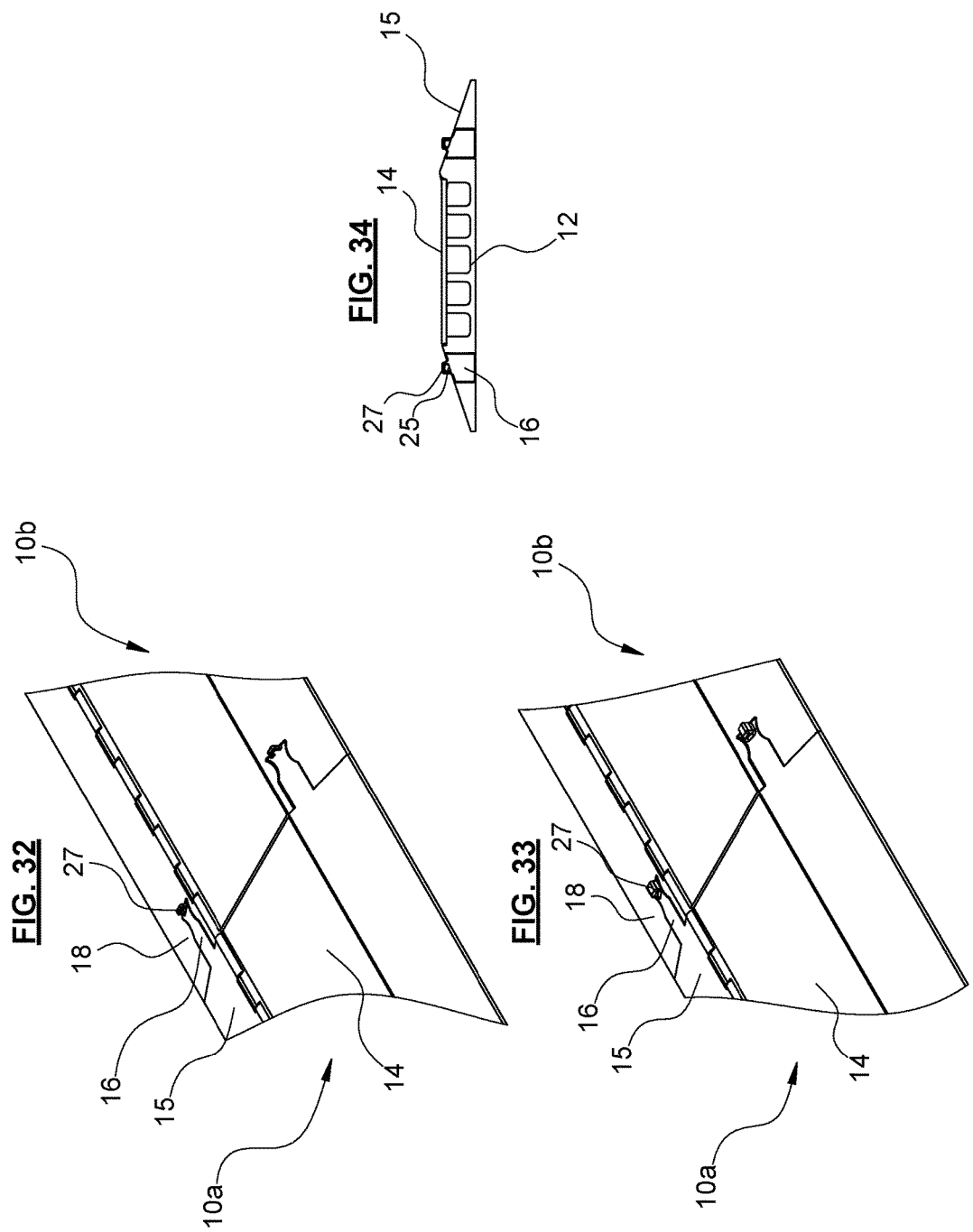

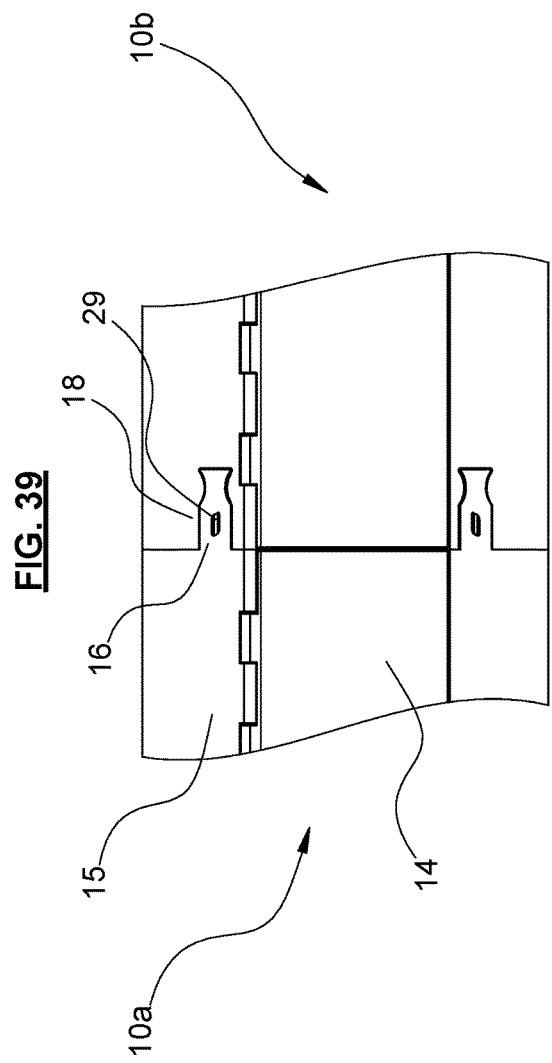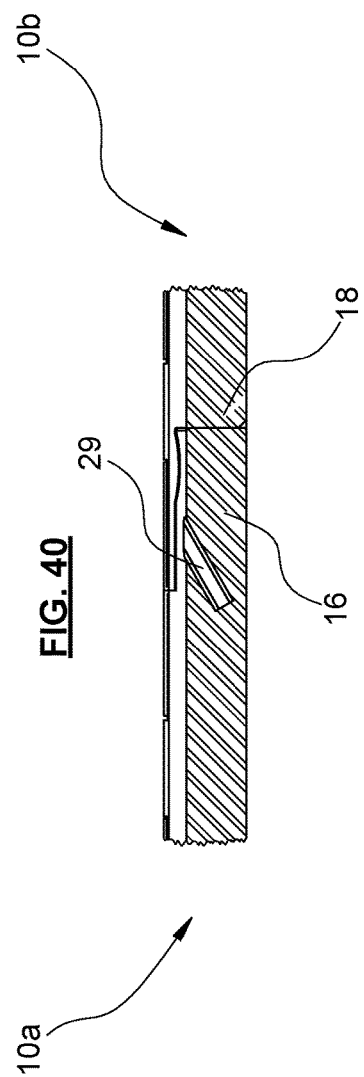

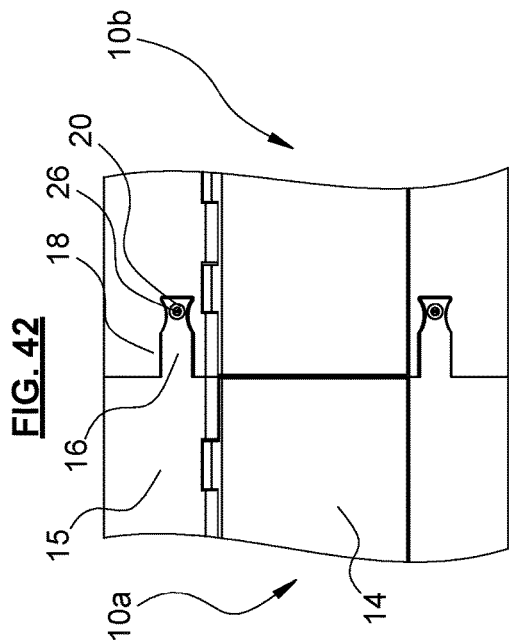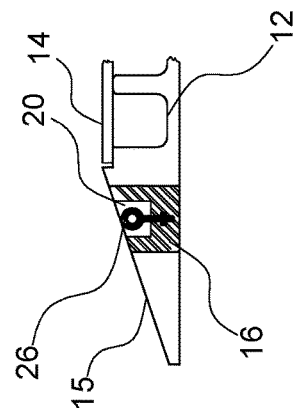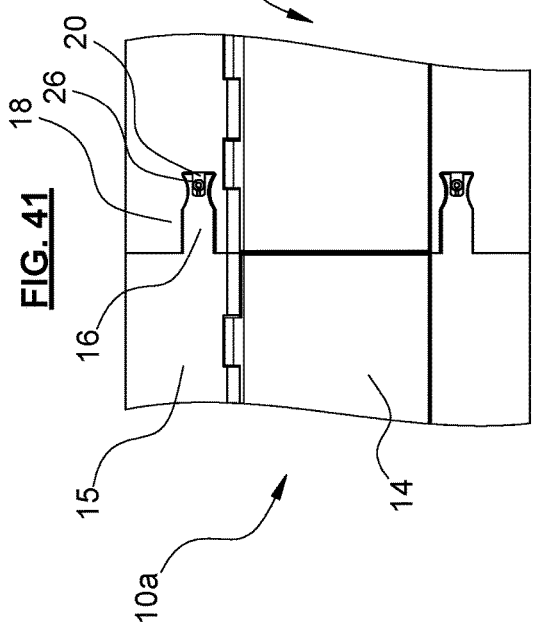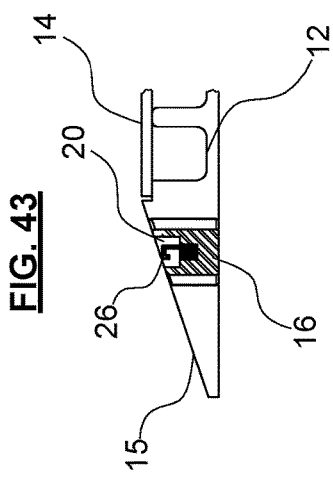

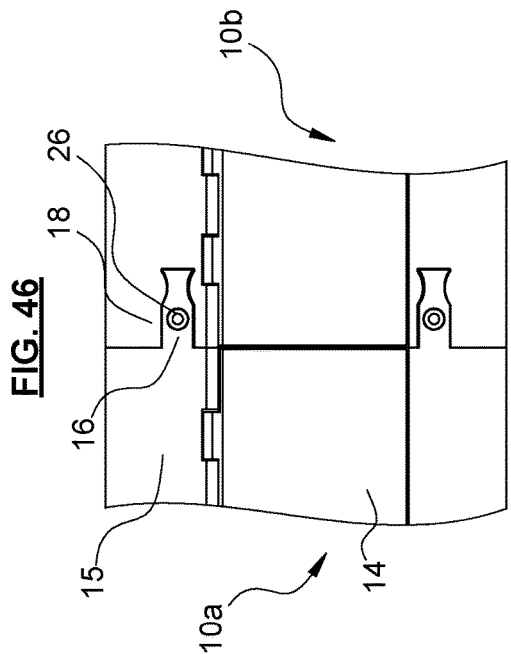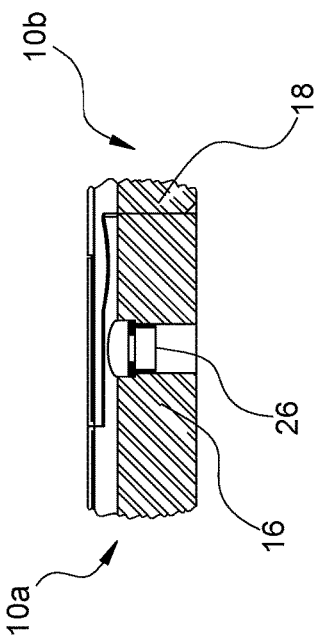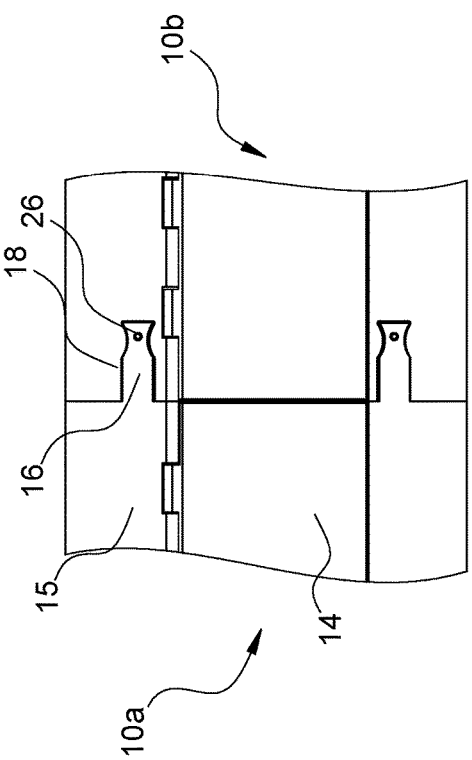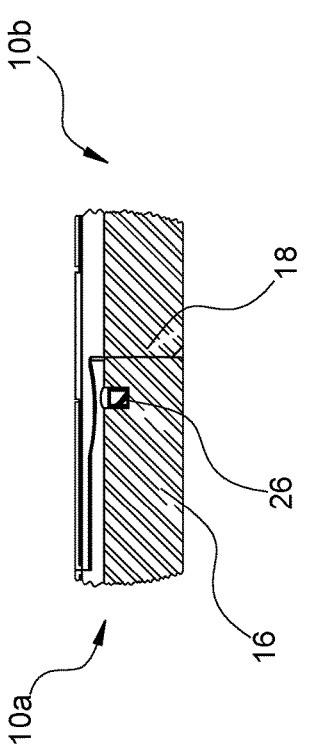

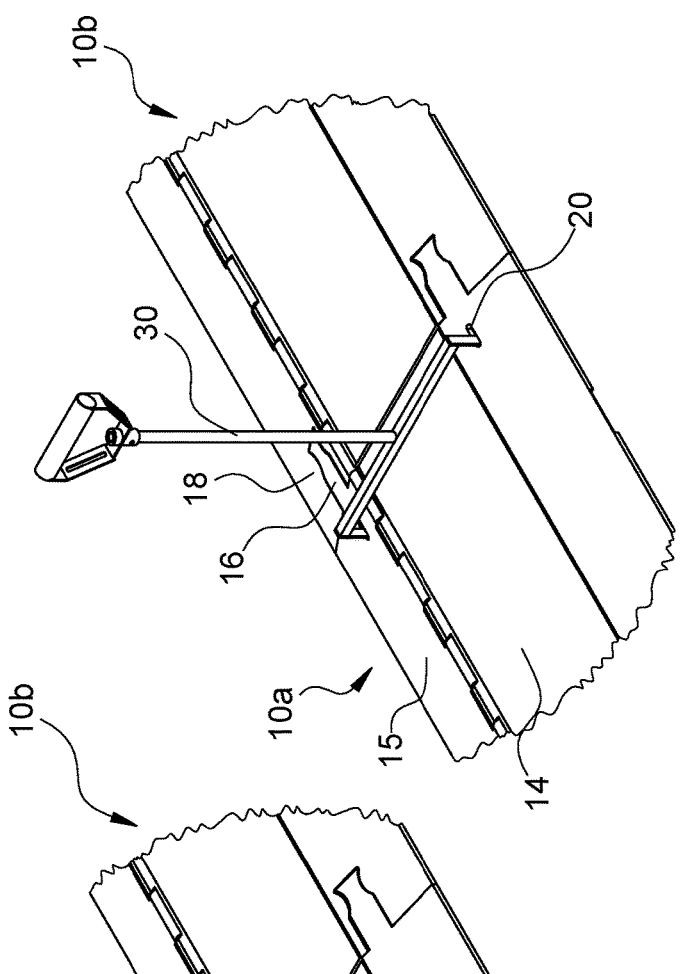
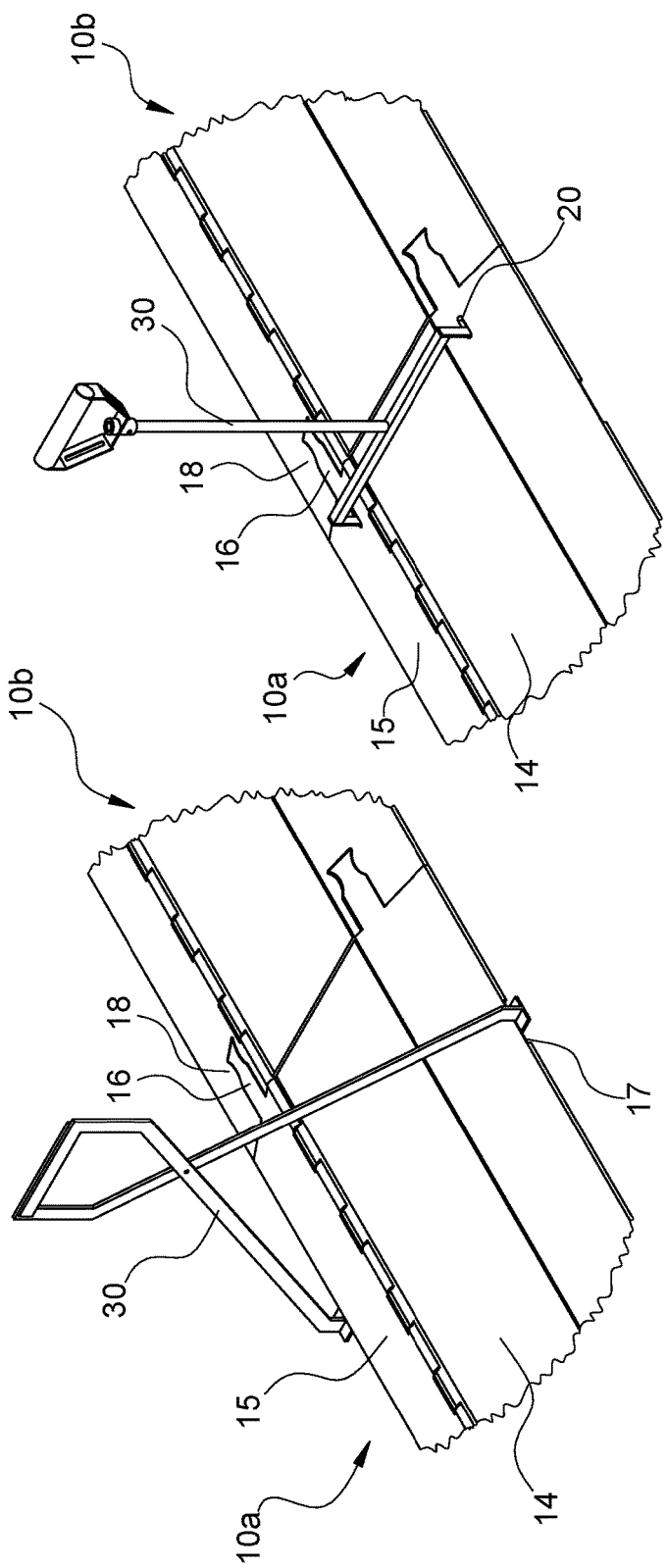
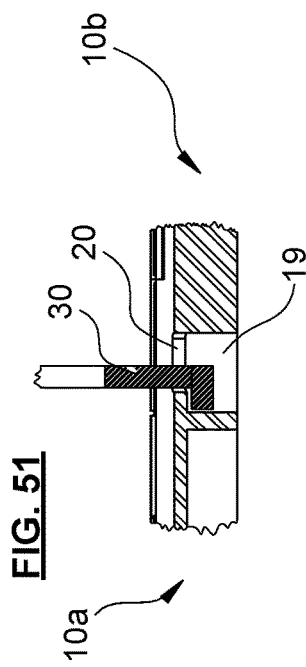

MODULAR CABLE PROTECTOR

RELATED APPLICATIONS

The present application is based on and claims priority to the Applicant's U.S. Provisional Patent Application 62/542,523, entitled "Modular Cable Protector," filed on Aug. 8, 2017; and U.S. Provisional Patent Application 62/568,005, entitled "Modular Cable Protector," filed on Oct. 4, 2017; and U.S. Provisional Patent Application 62/594,144, entitled "Modular Cable Protector," filed on Dec. 4, 2017.

BACKGROUND OF THE INVENTION

Field of the Invention

The present invention relates generally to the field of modular cable protectors. More specifically, the present invention discloses a modular cable protector with tool engagement features adjacent to its end connectors for removably engaging a hand tool to simplify disassembly of a series of such cable protectors.

Statement of the Problem

Modular cable protectors have been used for many years to protect cables, hoses and wiring from vehicular traffic and to minimize trip hazards for pedestrians. Cable protectors are frequently used at public events, such as concerts and sports events. Cable protectors are also used in factories, warehouses, mines and other situations where temporary cables, hoses and the like are deployed.

U.S. Design Pat. No. 412,490 (Henry) shows an example of a modular cable protector that has been widely used in the industry. As shown in the accompanying figures, a modular cable protector 10 typically includes a number of parallel, recessed channels 12 extending between the ends of the cable protector for carrying cables, hoses, wiring or the like. Two opposing side ramps 15 guide traffic over the cable protector. Complementary sets of end connectors 16 and 18 at the ends of the cable protector enable multiple cable protectors to be connected in series. For example, the cable protector shown in the Henry design patent features complementary male and female end connectors that are generally T-shaped. Several other end connector shapes are also commonly used. For example, the cable protector shown in the accompanying figures have a "dog bone" configuration. A lid 14 covers the channels and forms the top surface of the cable protector when the lid is closed. The lid pivots about a hinge running along one side so that the lid can be raised to provide access to the channels 12.

These cable protectors can be strung together in series to any desired length by engaging the complementary male/female connectors at the ends of the cables protectors. Large numbers of these cable protectors are often used at large sports or music venues. The problem is that disassembling these cable protectors can be very labor intensive. A worker must stoop down at the end of each cable protector and place his fingers under its side ramps to exert an upward force to disengage its end connectors from the adjacent cable protector.

Solution to the Problem

The present invention simplifies disassembly by providing tool engagement features on the cable protector for removably engaging a hand tool that can be used to quickly and easily disengage the end connectors on adjacent cable protectors.

For example, the tool engagement features can be a set of slots or recesses extending downward from the top of the cable protector adjacent to the end connectors. The bottom of each slot is equipped with a horizontal undercut or lip within the cable protector. The worker can insert a tool into the slots to engage these lips and then exert an upward force to disengage the end connectors from the adjacent cable protector. In this embodiment, the tool can have two vertical rods that fit into the slots, with horizontal protrusions at the bottom of the rods to engage the undercuts in the slots. These slots can be placed in a variety of locations (e.g., on the male connectors, near the head of the female connectors, or near the ends of the side ramps adjacent to the end connectors).

SUMMARY OF THE INVENTION

This invention provides a modular cable protector having a number of parallel channels for carrying cables and the like, complementary end connectors at each end for removably engaging adjacent cable protectors in series, and a number of tool engagement features. A tool removably engages these tool engagement features and allows a user to exert an upward force to disengage the end connectors on adjacent cable protectors. For example, the tool engagement features can be slots in the top surface of the cable protector with undercuts adjacent to the lower ends of the slots. In this embodiment, a tool with vertical rods is manually inserted into the slots to disengage the cable protectors. Horizontal projections at the bottom of the vertical rods engage the undercuts in the slots, and allow the user to disengage adjacent cable protectors by lifting upward on the tool. Alternatively, the tool engagement features could be pins, hooks, eye bolts, raised loops, threaded inserts or holes, undercuts, angled holes, friction-fit holes, or the like that can be removably engaged by a tool to exert an upward force.

These and other advantages, features, and objects of the present invention will be more readily understood in view of the following detailed description and the drawings.

BRIEF DESCRIPTION OF THE DRAWINGS

The present invention can be more readily understood in conjunction with the accompanying drawings, in which:

FIG. 2 is a top axonometric view of the cable protector 10 corresponding to FIG. 1 with the lid 14 open.

FIG. 3 is a top view of the cable protector 10.

FIG. 4 is a right side view of the cable protector 10.

FIG. 5 is a bottom axonometric view of the cable protector 10.

FIG. 11 is a top axonometric view corresponding to FIG. 6, showing two assembled cable protectors 10a, 10b with the tool 30 inserted in the slots 20.

FIG. 12 is a detail vertical cross-sectional view of the end connectors 16, 18 after insertion of the tool 30, corresponding to FIG. 11.

FIG. 13 is a detail top view of two assembled cable protectors 10a, 10b in an alternative embodiment of the present invention in which the slots 20 are located on the male end connectors 16.

FIG. 14 is a detail bottom view corresponding to FIG. 13.

FIG. 15 is a detail vertical cross-sectional view corresponding to FIGS. 13 and 14.

FIG. 16 is a detail top view of two assembled cable protectors 10a, 10b in another embodiment of the present invention in which the slots 20 and undercuts 25 are located at the head of the female end connectors 18.

FIG. 17 is a detail bottom view corresponding to FIG. 16.

FIG. 18 is a detail vertical cross-sectional view corresponding to FIGS. 16 and 17.

FIG. 19 is a detail top view of two assembled cable protectors 10a, 10b in another embodiment of the present invention in which the slots 20 are located at the head of the female end connectors 18. Each slot 20 is equipped with two undercuts 25, with one extending into the male end connector 16 of the adjacent cable protector 10a and the other undercut extending in the opposite direction into cable protector 10b.

FIG. 20 is a detail bottom view corresponding to FIG. 19.

FIG. 21 is a detail vertical cross-sectional view corresponding to FIGS. 19 and 20.

FIG. 22 is a detail top view of two assembled cable protectors 10a, 10b in another embodiment of the present invention in which the slots 20 are located near the female end connectors 18 of cable protector 10b. Each slot 20 is equipped with two undercuts 25 extending in opposite directions.

FIG. 23 is a detail bottom view corresponding to FIG. 22.

FIG. 24 is a detail vertical cross-sectional view corresponding to FIGS. 22 and 23.

FIG. 25 is a detail top view of two assembled cable protectors 10a, 10b in another embodiment of the present invention in which the slots 20 are located on the male end connectors 16 of cable protector 10a. A pin 26 extends across each slot 20 to serve as an undercut.

FIG. 26 is a detail bottom view corresponding to FIG. 25.

FIG. 27 is a detail vertical cross-sectional view corresponding to FIGS. 25 and 26.

FIG. 30 is a detail top view of two assembled cable protectors 10a, 10b in another embodiment of the present invention in which the slots 20 are located near the male end connectors 16 of cable protector 10a.

FIG. 32 is a detail axonometric view of two assembled cable protectors 10a, 10b in another embodiment of the present invention in which raised tool engagement features 27 are located on the top surfaces of the male end connectors 16.

FIG. 33 is a detail axonometric view of two assembled cable protectors 10a, 10b similar to FIG. 32 showing another embodiment with raised tool engagement features 27 on the top surface of the male end connectors 16.

FIG. 34 is an end view of the cable protector corresponding to FIG. 33.

FIG. 39 is a detail top view of two assembled cable protectors 10a, 10b with angled holes 29 in the male end connectors 16.

FIG. 40 is a vertical cross-section view corresponding to FIG. 39.

FIG. 41 is a detail top view of two assembled cable protectors 10a, 10b with tool engagement features 26 in the form of eyebolts mounted horizontally in recesses in the male end connectors 16.

FIG. 42 is a detail top view similar to FIG. 41 with tool engagement features 26 in the form of eyebolts embedded in recesses 20 in the male end connectors 16.

FIG. 43 is a vertical cross-sectional view of a cable protector with tool engagement features in the form of recessed hooks 26 in the male end connectors 16.

FIG. 44 is a vertical cross-sectional view similar to FIG. 42 with tool engagement features in the form of eyebolts 26 mounted vertically in recesses 20 in the male end connectors 16.

FIG. 45 is a detail top view of two assembled cable protectors 10a, 10b with tool engagement features 26 in the form of threaded inserts in the male end connectors 16.

FIG. 46 is a detail top view of two assembled cable protectors 10a, 10b similar to FIG. 45 with an alternative form of threaded inserts 26.

FIG. 47 is a vertical cross-sectional view corresponding to FIG. 45.

FIG. 48 is a vertical cross-sectional view corresponding to FIG. 46.

FIG. 49 is a detail axonometric view of two cable protectors 10a, 10b being disassembled by a scissor tool 30 that engages side cuts 17 along the edges of the sides ramps 15.

FIG. 50 is a detail axonometric view of two cable protectors 10a, 10b being disassembled by a tool 30 engaging slots 20 that extend into voids 19 in the body of the cable protector 10a adjacent to the male end connectors 16.

FIG. 51 is a detail vertical cross-sectional view corresponding to FIG. 50 showing one prong of the tool 30 engaging a slot 20 and void 19.

DETAILED DESCRIPTION OF THE INVENTION

Figure 1:
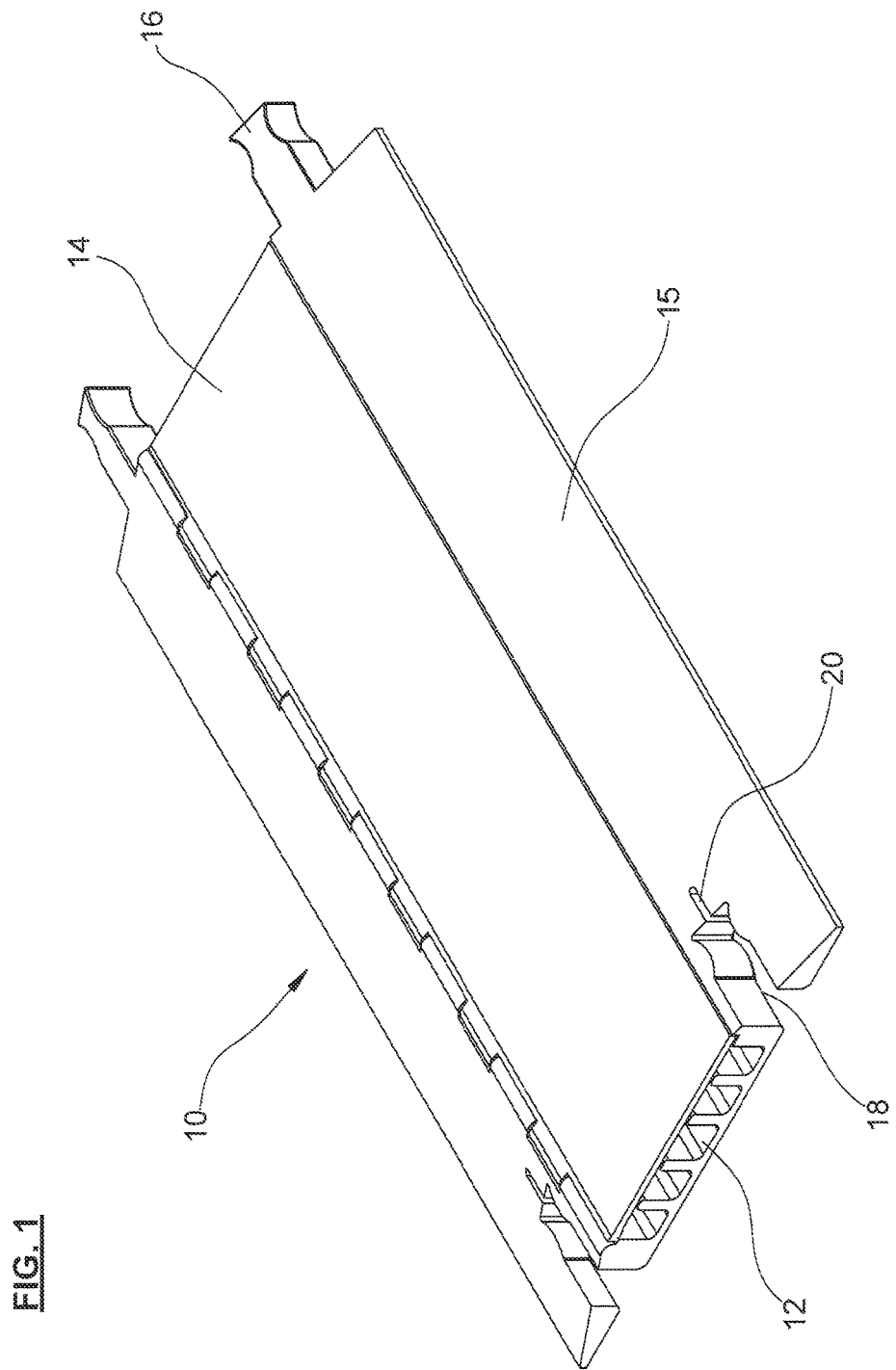
FIG. 1 is a top axonometric view of a modular cable protector 10 with the lid 14 closed.

FIGS. 1 and 2 are two axonometric views showing an embodiment of the present modular cable protector 10. Corresponding top, side and bottom axonometric view of the cable protector 10 are provided in FIGS. 3-5, respectively. The body of the cable protector 10 includes a number of parallel, recessed channels 12 extending between its ends for carrying cables, hoses, wiring or the like. Two opposing side ramps 15 guide traffic over the cable protector.

Figure 6:
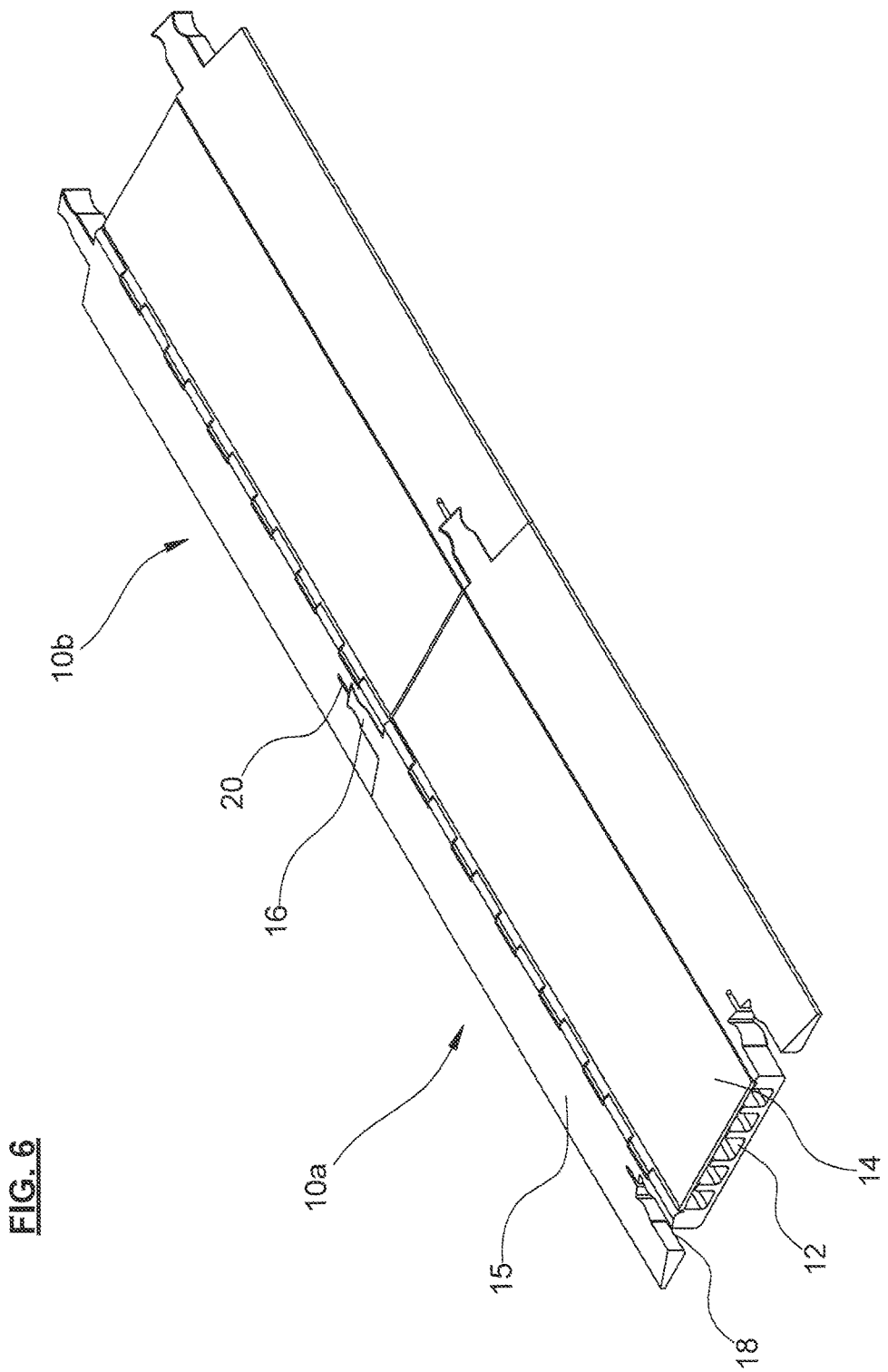
FIG. 6 is a top axonometric view of two assembled cable protectors 10a, 10b.
Figure 7:
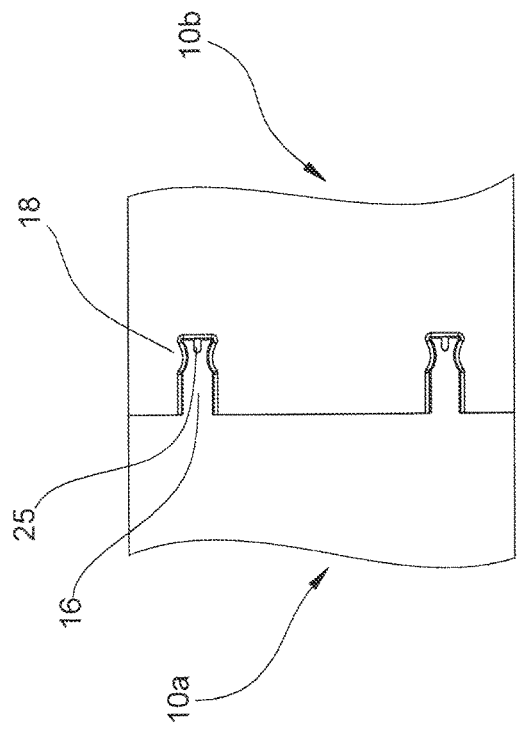
FIG. 7 is a detail top view of the end connectors 16, 18 of the assembled cable protectors 10a, 10b in FIG. 6.
Figure 8:
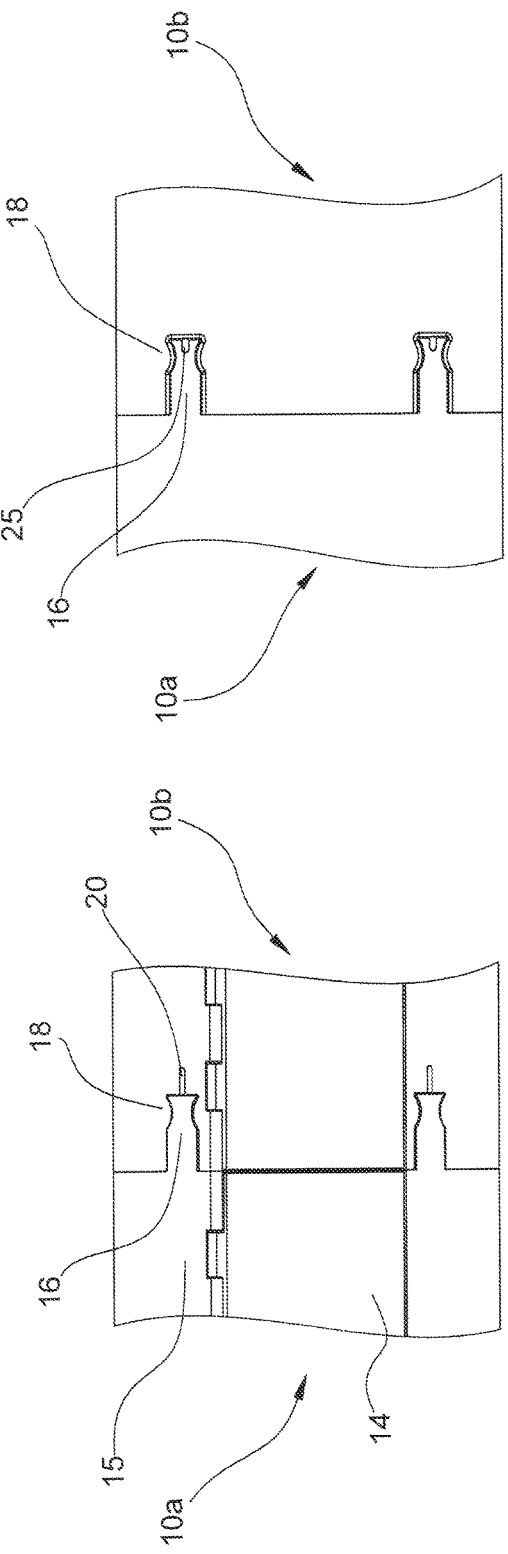
FIG. 8 is a detail bottom view of the end connectors 16, 18 of the assembled cable protectors 10a, 10b in FIG. 6.
Figure 9:
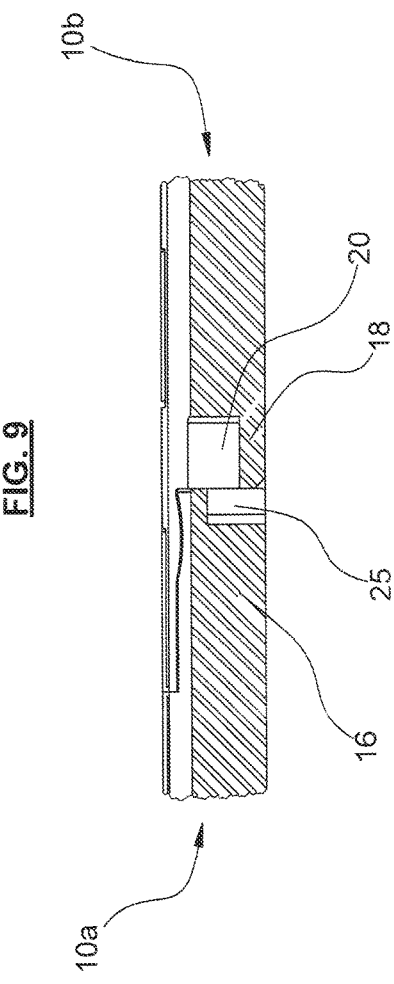
FIG. 9 is a detail vertical cross-sectional view of the end connectors 16, 18 of the assembled cable protectors 10a, 10b in FIG. 6.

Complementary sets of end connectors 16, 18 at the ends of the cable protector 10 enable multiple cable protectors 10a, 10b to be connected in series as shown in FIG. 6 with the channels 12 of the cable protectors 10a, 10b in alignment. This specific embodiment has "dog bone"-shaped male end connectors 16 at one end and complementary female end connectors 18 at the other end of the cable protector 10. However, other shapes and configurations could be readily substituted for the end connectors 16, 18.

A lid 14 covers the channels 12. The lid 14 and side ramps 15 form the upper surface of the cable protector 10 when the lid 14 is closed to cover the interior channels 12 as illustrated in FIG. 1. FIG. 2 shows the cable protector 10 with the lid 14 open to allow access to the channels 12.

The cable protector 10 includes a number of tool engagement features for removably engaging a tool, as will be discussed in greater detail below. In this embodiment, the tool engagement features are slots 20 or openings that extend downward from the top surface into the body of the cable protector 10 adjacent to the end connectors 16, 18. Each opening 20 has at least one undercut or lip 25 extending horizontally from its lower end. For example, the undercut 25 can extend horizontally within the body beneath the upper surface of the cable protector 10. FIGS. 9, 15, 18, 21 and 24 are cross-sectional views of various embodiments of a slot 20 and undercut 25.

Figure 10:
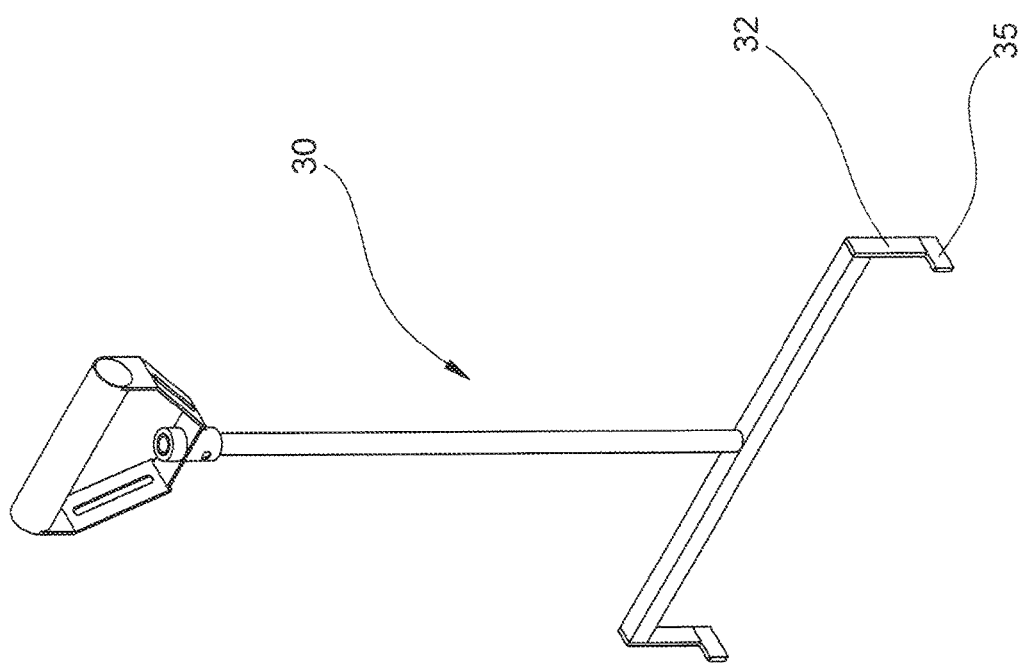
FIG. 10 is an axonometric view of a tool 30 for disengaging cable protectors.
Figure 29:
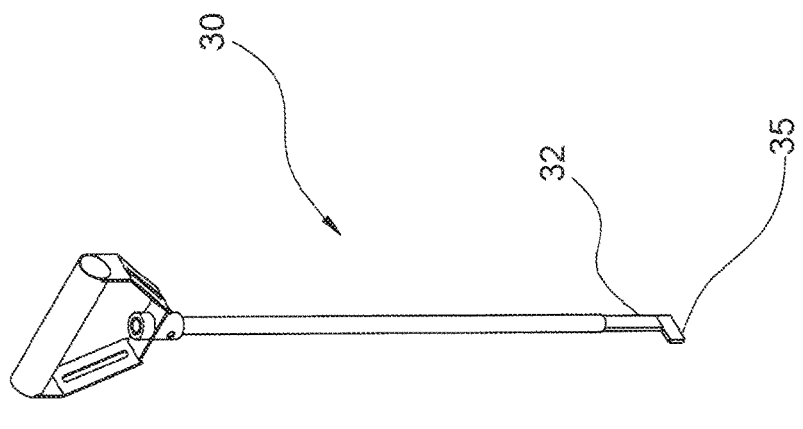
FIG. 29 is an axonometric view of another embodiment of the tool 30.
Figure 28:
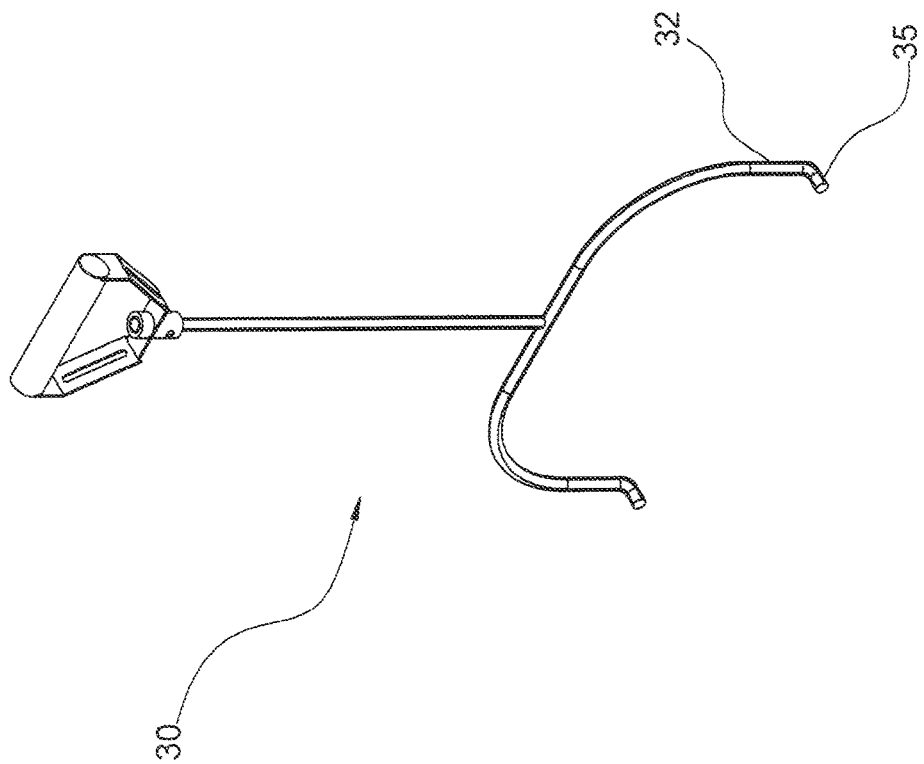
FIG. 28 is an axonometric view of an alternative embodiment of the tool 30.

FIG. 10 illustrate one possible embodiment of a tool 30 that can be used to engage the slots 20 and undercuts 25 to disconnect a series of cable protectors. This tool 30 has two vertical rods or members 32 designed to be inserted into corresponding slots 20 in the top of a cable protector 10. Horizontal protrusions 35 at the lower ends of the vertical rods removably engage the undercuts 25 in the cable protector 10b as depicted in FIGS. 11 and 12. In particular, the user initially inserts the rods 32 of the tool 30 vertically downward into the slots 20 in the top of the cable protector. The horizontal protrusions 35 can be made to engage the undercuts 25 in the slots 20 either by slightly pivoting the upper end of the tool 30, or shifting the entire tool 30 slightly forward in the slots 20 toward the undercuts 25, so that the horizontal protrusions 35 extend into the undercuts 25 and also catch under the undercuts 25. The user then exerts an upward force on the tool 30 to lift the cable protector 10a and disconnect its end connectors 16, 18 from those of the adjacent cable protector 10b. The user can reverse the insertion process to disengage and remove the tool 30 from the cable protector 10b. FIGS. 28 and 29 show alternative embodiments of the tool 30.

It should be noted that the size, shape and proportions of these slots 20 and undercuts 25 are largely a matter of design choice. It should also be understood that the terms "slot" and "undercut" should be broadly construed. A relatively narrow slot offers the advantages of being visually unobtrusive, minimizing the risk of being a trip hazard, and minimizing the risk of the slot becoming obstructed with dirt or debris. However, the slots 20 could have a wide range of shapes, dimensions and proportions. For example, the slots 20 could be rectangular, square, circular, tapered or oval. Also, the slots 20 can have any desired orientation with respect to the cable protector 10. Similarly the undercuts 25 can have any desired shape, dimensions and proportions. Each slot can be provided with multiple undercuts 25 allowing the tool 30 to be inserted in more than one orientation. For example, the slot 20 could be a round hole or recess with an annular peripheral undercut extending outward about the lower end of the hole.

The locations of the slots 20 and undercuts 25 on the cable protector 10 are also largely a matter of design choice. For example, FIGS. 13-15 show the slots 20 on the male end connectors 16. FIGS. 16-18 show the slots 20 adjacent to the heads of the female end connectors 18. Alternatively, the slots 20 could be located on the side ramps 15 adjacent to the end connectors 16, 18.

FIGS. 6-9 show an embodiment in which the tool engagement features bridge two adjacent cable protectors 10a and 10b. In FIGS. 6-9, the slots 20 are vertical channels extending downward along the perimeter of the female end connectors 18 (e.g., at the head of the female end connectors 18) of a first cable protector 10b. The corresponding undercuts 25 extend into the male end connectors 16 of an adjacent cable protector 10a. These undercuts 25 align with the slots 20 when the cable protectors 10a, 10b are assembled. Insertion of the tool 30 into the slots 20 in the first cable protector 10b causes its horizontal protrusions 35 to extend into the undercuts 25 in the second cable protector 10a, as shown in FIG. 12. The cable protectors 10a, 10b can then be disengaged by lifting upward on the tool 30. Similarly, the locations of the slots 20 and undercuts 25 could be reversed, so that the slots 20 are vertical channels extending downward along the perimeter of the male end connectors (e.g., at the ends of the male end connectors 16) of a first cable protector and the undercuts 25 extend into the body of a second cable protector adjacent to its female end connectors 18.

Alternatively, the tool engagement features (slots 20 and undercuts 25) could span across two adjacent cable protectors 10a, 10b at other locations along the ends of the cable protectors 10a,10b. For example, the slots 20 and undercuts 25 could be in the side ramps 15 adjacent to the end connectors 16, 18. More generally, the slots 20 can be vertical channels the extend downward from the upper surface along a first end of each cable protector, while the undercuts 25 extend horizontally into the second end beneath the upper surface of each cable protector. The slots 20 and undercuts 25 are aligned when the cable protector are connected in series with an adjacent like cable protector, as previously discussed.

Figure 31:
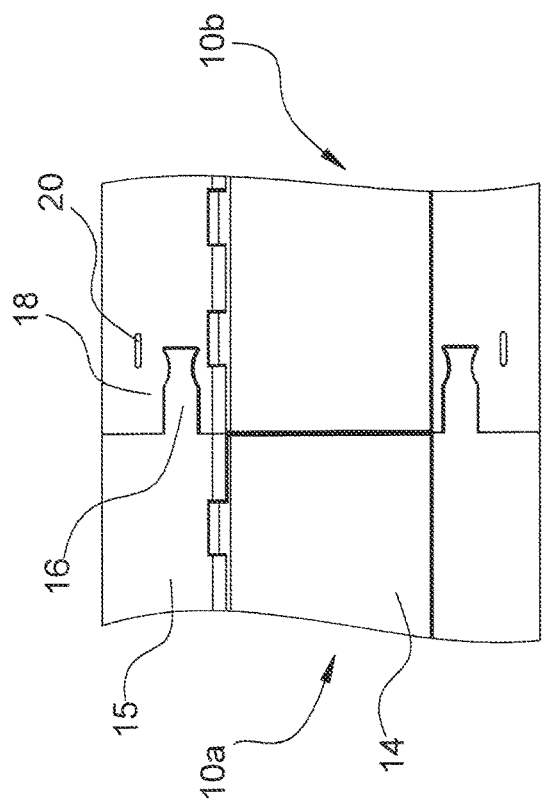
FIG. 31 is a detail top view of two assembled cable protectors 10a, 10b in another embodiment of the present invention in which the slots 20 are located on the sides ramps 15 adjacent to the female end connectors 18 of the cable protector 10b.
Figure 30:
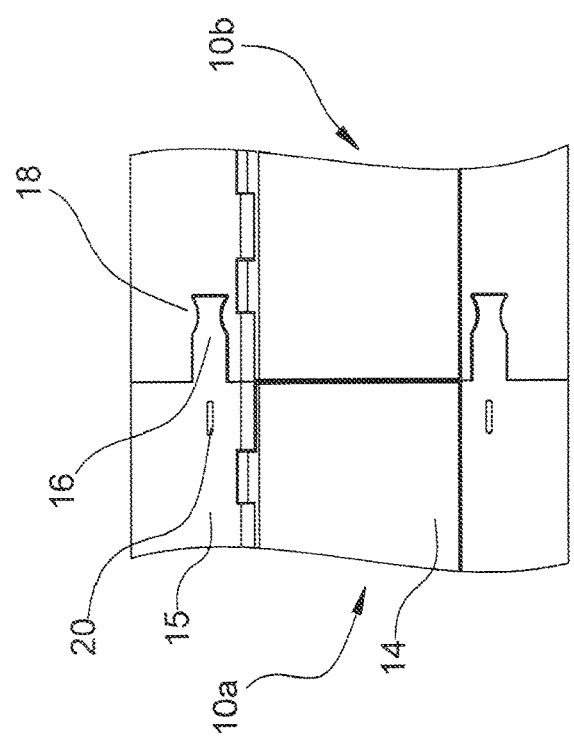

The slots 20 and undercuts 25 could also be located in various areas of the body of the cable protector 10b further from the end connectors 16, 18, as shown for example in FIGS. 22-24 and 30-31, although these configurations might make it more difficult to disengage the end connectors 16, 19 due to torsion created by exerting a vertical upward force on the tool 30 at a distance from the end connectors 16, 18. It should be noted that the slots 20 in the embodiment depicted in FIGS. 22-24 are each equipped with two undercuts 25 extending in opposite directions, similar to those shown in FIGS. 19-21. This allows the tool 30 to be inserted in either of two possible orientations. FIG. 22 show the slots 20 positioned near the head of the female end connectors 18 in cable protector 10b. In contrast, FIG. 30 shows the slots 20 located near the base of the male connectors 16 in cable protector 10a. FIG. 31 shows the slots near the female end connectors 18 on the side ramps 15 of cable protector 10b.

In the embodiment shown in FIGS. 19-21, one undercut extends into the male end connector 16 of the adjacent cable protector 10a, while the second undercut extends in the opposite direction into cable protector 10b. This allows the user to select which cable protector 10a or 10b will be lifted upward by the vertical force exerted by the tool 30. For example, if the user is disengaging a string of cable protectors from left to right in FIG. 19, the user may wish to stand on the left cable protector 10a (as an anchoring weight) and insert the tool 30 so that its horizontal protrusions 35 exert an upward force on the undercuts 25 in the right cable protector 10b to thereby disengage the cable protector 10a and 10b. The user can then easily repeat this process on the successive cable protectors to the right of cable protector 10b. A similar process can be employed working right-to-left by reversing the direction of the tool 30 and using the second undercut extending under the male end connectors 16.

FIGS. 32-53 show several alternative embodiments of the present invention having other types of tool engagement features. FIG. 32 shows an embodiment with raised tool engagement features 27 located on the top surfaces of the male end connectors 16. Similarly, FIGS. 33 and 34 show another embodiment with raised tool engagement features 27 on the top surfaces of the male end connectors 16. In both cases, the tool 30 has horizontal projections that can be inserted through the raised features 27 to removably engage the cable protector.

Figure 35:
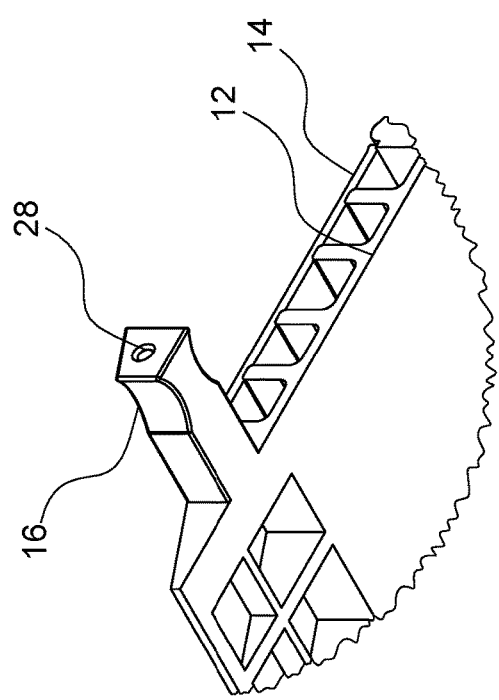
FIG. 35 is a bottom axonometric detail view of a cable protector with holes 28 in the distal ends of the male end connectors 16.
Figure 36:
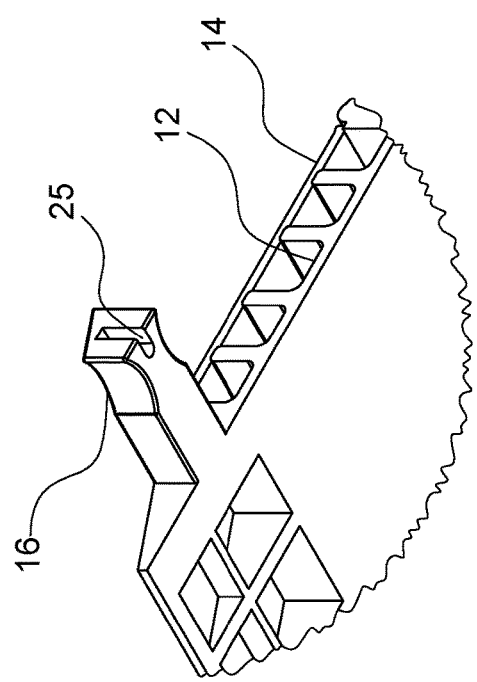
FIG. 36 is a bottom axonometric detail view of a cable protector with undercuts 25 at the distal ends of the male end connectors 16.
Figure 37:
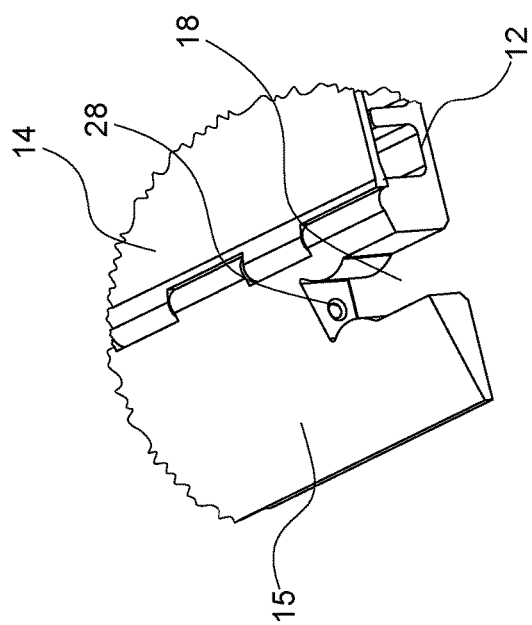
FIG. 37 is a top axonometric detail view of a cable protector with holes 28 in the ends of the female end connectors 18.
Figure 38:
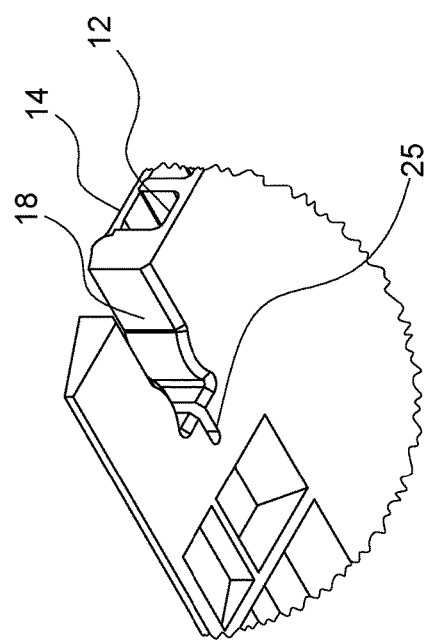
FIG. 38 is a bottom axonometric detail view of a cable protector with undercuts 25 at the ends of the female end connectors 18.

FIG. 35 illustrates an embodiment with holes 28 in the distal ends of the male end connectors 16. FIG. 36 shows an embodiment with undercuts 25 at the distal ends of the male end connectors 16. FIG. 37 depicts an embodiment with holes 28 in the ends of the female end connectors 18, and FIG. 38 shows undercuts 25 at the ends of the female end connectors 18. Here again, horizontal projections on the tool 30 can be inserted into the holes 28 in FIGS. 35 and 37, or the undercuts 25 in FIGS. 36 and 38 to removably engage the cable protector. FIGS. 39 and 40 show an embodiment with angled holes 29 in the male end connectors 16 to accommodate corresponding angled projections extending from the lower end of the tool 30.

FIGS. 25-27 and 41-44 illustrate alternative embodiments of the present invention using pins, eyebolts or recessed hooks 26 secured to the body of the cable protector as the tool engagement features. These tool engagement features can be mounted in recesses 20 in the cable protector, as shown for example in FIGS. 25-27 and 41-44, or embedded in the surface of the cable protector.

FIGS. 45-48 show two alternative embodiments of the present invention using threaded inserts 26 as the tool engagement features. These threaded inserts 26 extend into the upper surface of the cable protector. In these embodiments, the tool 30 has a threaded lower end that can be threaded into the threaded inserts 26 by a quick twisting motion (e.g., a quarter turn) to removably engage the tool 30 to the cable protector 10a.

FIG. 49 illustrates two cable protectors 10a, 10b being disassembled by a tool 30 with a scissor mechanism that engages side cuts 17 along the edges of the sides ramps 15. The upper handles of the tool 30 can be moved laterally inward or outward to allow the user to grip the side cuts 17 in the edges of the side ramps 15.

FIGS. 50 and 51 show an embodiment in which the tool engagement features are slots 20 that extend into voids 19 in the body of the cable protector 10a. Conventional cable protectors include these voids 19 to reduce weight and costs. In this embodiment, the slots 20 and voids 19 effectively create undercuts, lips or edges that can be engaged by the prongs of the tool 30, as depicted in FIG. 51.

Figure 52:
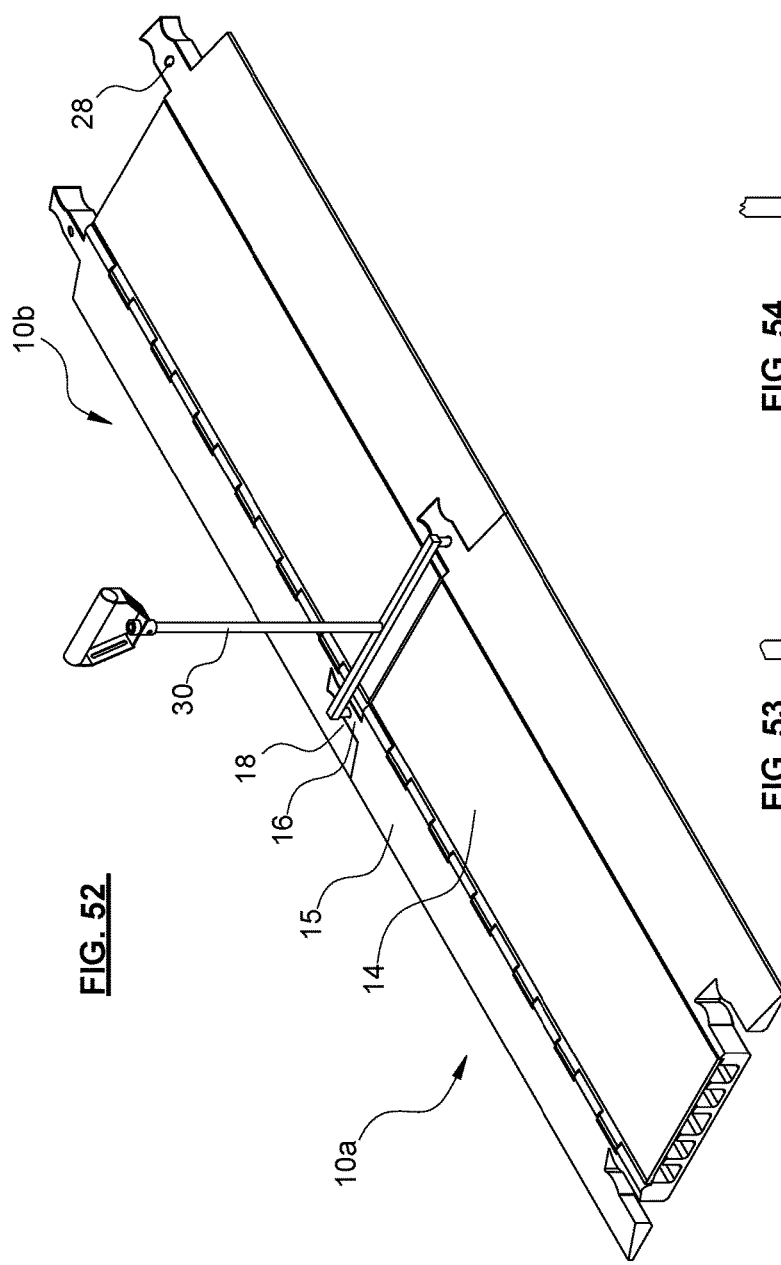
FIG. 52 is a top axonometric view of two cable protectors 10a, 10b being disassembled by a tool 30 inserted into holes 28 in the male end connectors 15.
Figure 53:
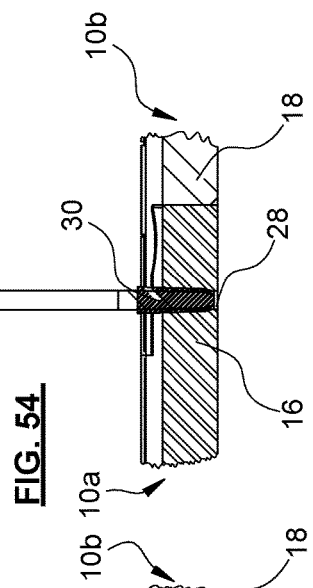
FIG. 53 is a detail vertical cross-sectional view corresponding to FIG. 52 showing one of the lower ends 36 of the tool 30 in a friction fit with the hole 28 in a male end connector 16.

FIGS. 52 and 53 show an embodiment of the present invention in which the tool engagement features are holes 28 in the top surface of the cable protector. The lower ends of the tool 30 are slightly larger than the holes 28 and engage these holes 28 by a friction fit. The lower ends of the tool 30 are initially pushed the holes 28 to establish a connection. The user can then lift upward on tool 30 to disengage the end connectors 16 from the adjacent cable protector 10b. Frictional engagement between the tool 30 and holes 28 can be maximized by lifting upward on the tool 30 with a slightly off-vertical force vector.

Figure 54:
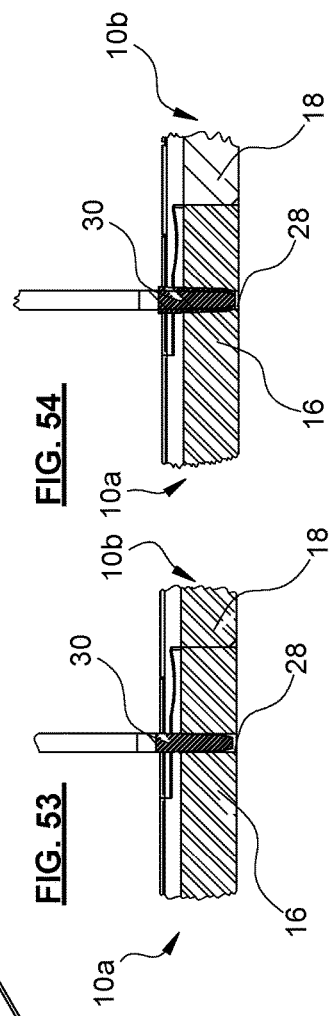
FIG. 54 is a detail vertical cross-sectional view corresponding to FIG. 52 showing an alternative embodiment in which the lower ends of the tool 30 expand radially outward to engage the hole 28 in the male end connector 16.

FIG. 54 shows another embodiment in which the lower end of the tool 30 is initially inserted in a hole 28 in the cable protector 10a. The user can then manually cause the lower end of the tool 30 to expand radially outward to removably engage the hole 28.

Figure 55:
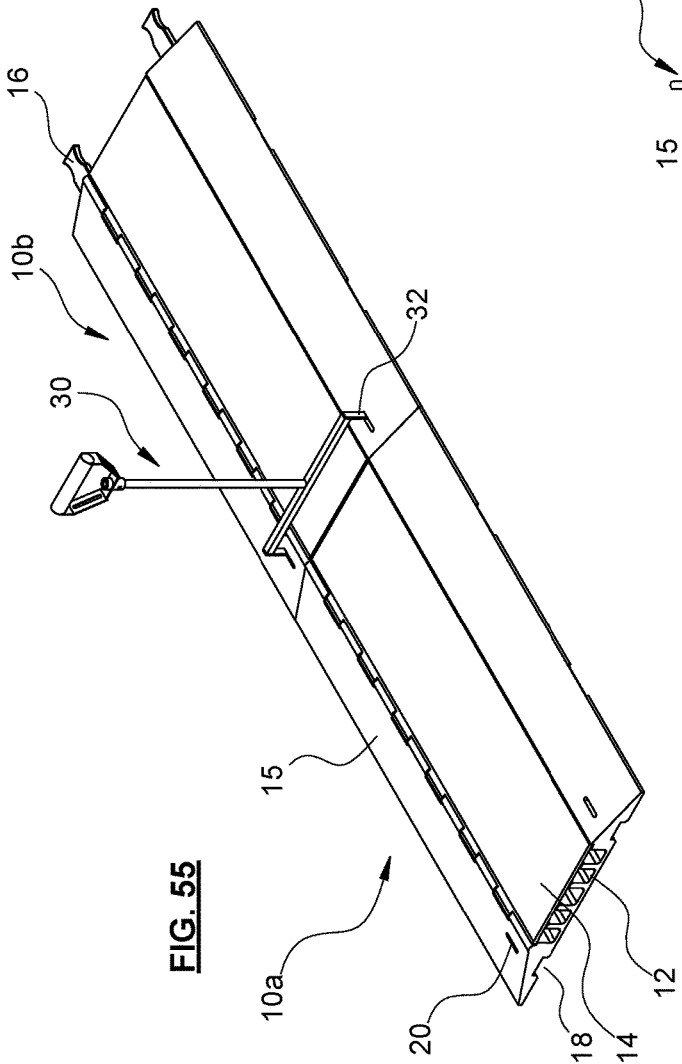
FIG. 55 is a top axonometric view of two cable protectors 10a, 10b with hidden end connectors 16, 18 being disassembled by a tool 30.

FIGS. 55-59 illustrate two embodiments of the present invention intended for use in cable protectors 10a, 10b having "hidden" end connectors 16, 18. In these embodiments, the male end connectors 16 have a reduced height that does not extend to the top surface of the cable protector 10b. Similarly, the corresponding female connectors 18 do not extend completely through the cable protector 10b to its top surface, but rather the female end connectors 18 are formed as recesses in the bottom of the cable protector 10b adjacent to its end. In this configuration, both sets of end connectors 16, 18 are concealed when the cable protectors 10a, 10b are connected as shown in FIG. 55.

Figure 57:
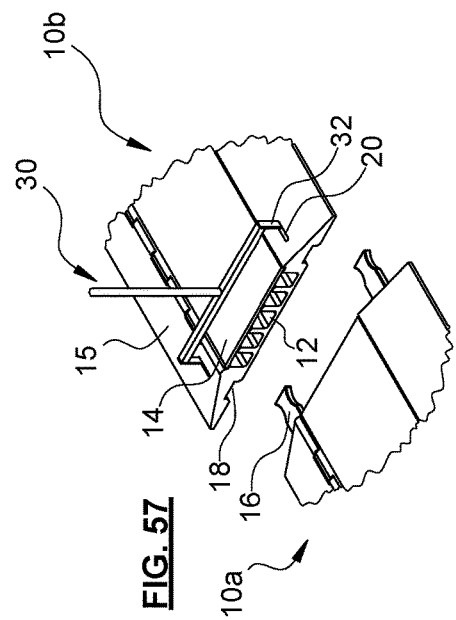
FIG. 57 is a detail axonometric view corresponding to FIGS. 55 and 56 showing the cable protectors 10a, 10b after the hidden end connectors 16, 18 have been disengaged.
Figure 56:
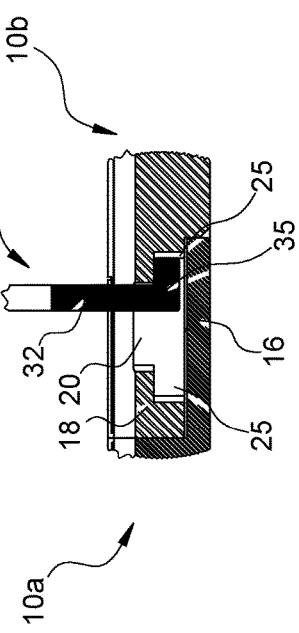
FIG. 56 is a detail vertical cross-sectional view corresponding to FIG. 55 showing the hidden end connectors 16, 18 and tool 30.

In the embodiment shown in FIGS. 55-57, a slot 20 extends downward from the top surface of the cable protector 10b in vertical alignment with the hidden end connectors 16, 18 below. An undercut 25 at the bottom of the slot 20 is used to engage the horizontal protrusion 35 on the lower end of the tool 30, as previously discussed. Alternatively, the slot 20 could be shifted out of vertical alignment with the male end connector 16. In this embodiment, the lower end of the tool 30 is inserted into the slot 20 and undercut 25 as previously discussed to enable the user to exert an upward force on the cable protector 10b. Here again, the end connectors 16, 18 remain completely hidden while the cable protectors 10a, 10b are connected together.

Figure 59:
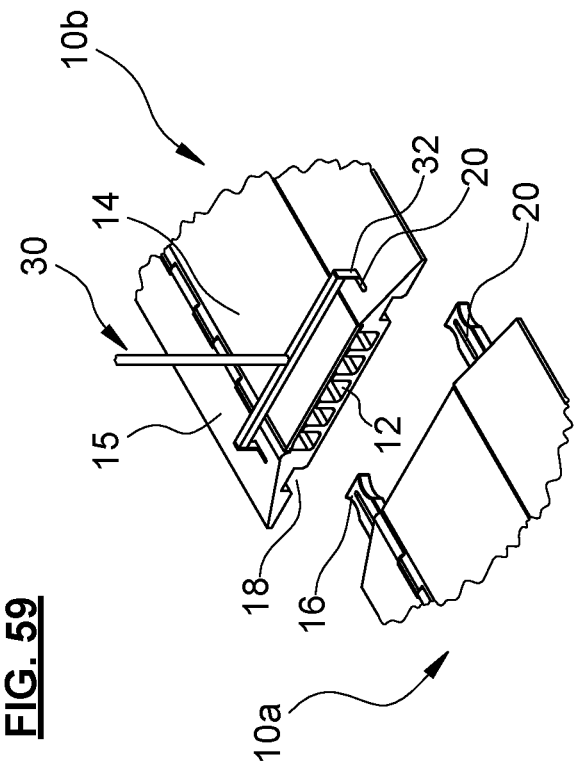
FIG. 59 is a detail axonometric view corresponding to FIG. 58 showing the cable protectors 10a, 10b after the hidden end connectors 16, 18 have been disengaged.
Figure 58:
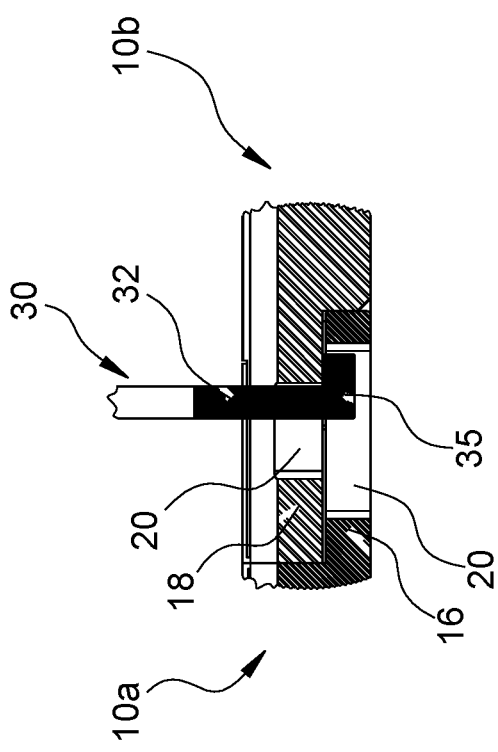
FIG. 58 is a detail vertical cross-sectional view of another embodiment in which the slot 20 extends downward through the male end connector 16.

FIGS. 58-59 show another embodiment of the present invention in which the slots 20 extend downward from the top surface of the cable protector 10b, and also extend through the hidden male end connectors 16 beneath. The lip of the slot 20 where it meets the edge of female end connector 18 forms an undercut for engaging the horizontal protrusions 35 on the lower end of the tool 30, as shown in FIG. 58. This approach allows the wall of the cable protector 10b above the female end connector 18 to have a greater thickness, and thereby enhances the strength and rigidity of the structure. Alternatively, the lower portion of the slot 20 could extend only partially into the male end connector 16. Also, the lower portion of the slot 20 could extend through the end of the male end connector 16.

The above disclosure sets forth a number of embodiments of the present invention described in detail with respect to the accompanying drawings. Those skilled in this art will appreciate that various changes, modifications, other structural arrangements, and other embodiments could be practiced under the teachings of the present invention without departing from the scope of this invention as set forth in the following claims.

I claim:

1. A system for disconnecting a series of modular cable protectors, said system comprising:
    a plurality of modular cable protectors, each having:
    (a) a body having an upper surface with opposing side ramps, and opposing ends;
    (b) at least one channel extending in parallel between the ends;
    (c) end connectors on the ends for connecting the cable protectors in series with the channels in alignment with the channels of adjacent cable protectors; and
    (d) at least one tool engagement feature having an opening in the upper surface of the cable protector extending downward into the body of the cable protector, and an undercut extending horizontally from the opening within the body beneath the upper surface of the cable protector; and
    a tool with a vertical member having a lower end insertable into the opening with a horizontal protrusion extending from the lower end of the vertical member for removably engaging the undercut, said vertical member extending upward from the tool engagement feature to enable an upward force on the tool to be exerted on the cable protector to thereby disengage the end connectors from an adjacent cable protector.

2. The system of claim 1 wherein the tool engagement feature is adjacent to an end connector.

3. The system of claim 1 wherein the end connectors comprise complementary sets of male and female end connectors on adjacent cable protectors, and the tool engagement feature is on a male end connector.

4. The system of claim 1 wherein the end connectors comprise complementary sets of male and female end connectors on adjacent cable protectors, and wherein the opening is a channel extending downward along the perimeter of a male end connector and the undercut extends into the body of an adjacent cable protector adjacent to a female end connector.

5. The system of claim 1 wherein the end connectors comprise complementary sets of male and female end connectors on adjacent cable protectors, and wherein the opening is a channel extending downward along the perimeter of a female end connector and the undercut extends into a male end connector of an adjacent cable protector.

6. A system for disconnecting a series of modular cable protectors, said system comprising:
    a plurality of modular cable protectors, each having:
    (a) a body having an upper surface with opposing side ramps, and opposing ends;
    (b) at least one channel extending in parallel between the ends;
    (c) end connectors on the ends for connecting the cable protectors in series with the channels in alignment with the channels of adjacent cable protectors; and
    (d) at least one tool engagement feature accessible on the upper surface having a side cut in the side ramp of the cable protector; and
    a tool for removably engaging the tool engagement feature of a cable protector, said tool extending upward from the tool engagement feature to enable an upward force on the tool to be exerted on the cable protector to thereby disengage the end connectors from an adjacent cable protector.

7. A system for disconnecting a series of modular cable protectors, said system comprising:
    a plurality of modular cable protectors, each having:
    (a) a body having an upper surface with opposing side ramps, and opposing ends;
    (b) at least one channel extending in parallel between the ends;
    (c) end connectors on the ends for connecting the cable protectors in series with the channels in alignment with the channels of adjacent cable protectors; and
    (d) at least one tool engagement feature accessible on the upper surface having an opening in the upper surface of the cable protector; and
    a tool having a lower end for removably engaging the opening by a friction fit, said tool extending upward from the tool engagement feature to enable an upward force on the tool to be exerted on the cable protector to thereby disengage the end connectors from an adjacent cable protector.

8. A system for disconnecting a series of modular cable protectors, said system comprising:
    a plurality of modular cable protectors, each having:
    (a) a body having an upper surface with opposing side ramps, and opposing ends;
    (b) at least one channel extending in parallel between the ends;
    (c) end connectors on the ends for connecting the cable protectors in series with the channels in alignment with the channels of adjacent cable protectors; and
    (d) at least one tool engagement feature, each having an opening extending downward through the upper surface of the cable protector with an undercut extending horizontally from the opening within the body beneath the upper surface of the cable protector; and
    a tool for removably engaging the tool engagement feature of a cable protector, said tool having a vertical member with a lower end insertable into the opening with a horizontal protrusion extending from the lower end of the vertical member for removably engaging the undercut to enable an upward force on the tool to be exerted on the cable protector and thereby disengage the end connectors from an adjacent cable protector.

9. The system of claim 8 wherein the tool engagement feature is adjacent to an end connector.

10. The system of claim 8 wherein the end connectors comprise complementary sets of male and female end connectors on adjacent cable protectors, and the tool engagement feature is on a male end connector.

11. The system of claim 8 wherein the end connectors comprise complementary sets of male and female end connectors on adjacent cable protectors, and wherein the opening is a channel extending downward along the perimeter of a male end connector and the undercut extends into the body of an adjacent cable protector adjacent to a female end connector.

12. The system of claim 8 wherein the end connectors comprise complementary sets of male and female end connectors on adjacent cable protectors, and wherein the opening is a channel extending downward along the perimeter of a female end connector and the undercut extends into a male end connector of an adjacent cable protector.

13. A modular cable protector comprising:
- a body having an upper surface with opposing side ramps, and opposing first and second ends;
- at least one channel extending in parallel between the ends;
- complementary sets of end connectors on the ends for connecting a plurality of like cable protectors in series with the channels in alignment with the channels of adjacent cable protectors; and
- a vertical channel extending downward from the upper surface along the first end having a slot extending into an end connector on the first end; and
- an undercut extending horizontally beneath the upper surface into the body of the cable protector adjacent to a complementary end connector on the second end in alignment with the vertical channel of an adjacent like cable protector when the cable protector is connected in series with an adjacent like cable protector.

* * * * *